US010857828B2

(12) United States Patent
Okada et al.

(10) Patent No.: US 10,857,828 B2
(45) Date of Patent: Dec. 8, 2020

(54) IDENTIFICATION DEVICE, IDENTIFICATION METHOD, AND COMPUTER-READABLE MEDIUM INCLUDING IDENTIFICATION PROGRAM

(71) Applicant: TOPPAN PRINTING CO., LTD., Tokyo (JP)

(72) Inventors: Takashi Okada, Tokyo (JP); Tomohito Masuda, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 245 days.

(21) Appl. No.: 15/988,456

(22) Filed: May 24, 2018

(65) Prior Publication Data
US 2018/0264868 A1  Sep. 20, 2018

Related U.S. Application Data

(63) Continuation of application No. PCT/JP2016/084733, filed on Nov. 24, 2016.

(30) Foreign Application Priority Data

Nov. 26, 2015 (JP) ................................ 2015-231141

(51) Int. Cl.
*B42D 25/328* (2014.01)
*G07D 7/202* (2016.01)
(Continued)

(52) U.S. Cl.
CPC ......... *B42D 25/328* (2014.10); *G07D 7/0032* (2017.05); *G07D 7/12* (2013.01); *G07D 7/202* (2017.05); *G07D 7/206* (2017.05)

(58) Field of Classification Search
CPC .... B42D 25/328; B42D 25/369; B42D 25/29; G07D 7/0032; G07D 7/206; G07D 7/12;
(Continued)

(56) References Cited

U.S. PATENT DOCUMENTS

2002/0163633 A1* 11/2002 Cohen ................... G07D 7/128
356/71
2005/0129282 A1  6/2005 O'Doherty et al.
(Continued)

FOREIGN PATENT DOCUMENTS

DE  10 2013 101 587  8/2014
DE  10 2013 113 340  6/2015
(Continued)

OTHER PUBLICATIONS

Extended European Search Report dated Jun. 19, 2019 in corresponding European Patent Application No. 16868595.6.
(Continued)

*Primary Examiner* — Wen Huang

(57) ABSTRACT

An identification device includes, an imaging condition determinator configured to determine an imaging condition as to whether or not an optical change in the anti-counterfeit medium is imageable from an observation angle that is an angle of captured image data in an imaging direction with respect to a reference line on an observation object surface of the anti-counterfeit medium being designed such that an observed pattern of light varies as the observation angle varies, a similarity calculator configured to obtain similarity between the captured image data and correct image data generated from the optical change corresponding to the observation angle when it is determined that the optical change is imageable under the imaging condition; and an authenticity determinator configured to perform authenticity determination as to whether or not the anti-counterfeit medium is correct based on whether or not the similarity exceeds a preset similarity threshold.

13 Claims, 10 Drawing Sheets

(51) Int. Cl.
  *G07D 7/12* (2016.01)
  *G07D 7/206* (2016.01)
  *G07D 7/00* (2016.01)

(58) Field of Classification Search
  CPC ........ G07D 7/202; G03H 1/0011; G03H 1/02;
  G02B 5/18
  USPC .......................................................... 359/2
  See application file for complete search history.

(56) References Cited

U.S. PATENT DOCUMENTS

| | | | |
|---|---|---|---|
| 2007/0279515 A1 | 12/2007 | Miyazaki et al. | |
| 2009/0018934 A1* | 1/2009 | Peng .................. | G06Q 20/4016 705/30 |
| 2010/0145867 A1* | 6/2010 | Fowkes .................. | G06F 21/31 705/318 |
| 2016/0063790 A1* | 3/2016 | Stewart .................... | G07D 7/20 356/365 |
| 2016/0307035 A1* | 10/2016 | Schilling ................ | G07D 7/128 |
| 2017/0203601 A1* | 7/2017 | Yashiki .................... | G02B 5/18 |

FOREIGN PATENT DOCUMENTS

| | | |
|---|---|---|
| JP | 3865763 | 10/2006 |
| JP | 2015-55909 | 3/2015 |

OTHER PUBLICATIONS

Chinese Office Action dated Sep. 2, 2019 in corresponding Chinese Patent Application No. 201680068396.0.
International Search Report dated Jan. 24, 2017 in corresponding International Patent Application No. PCT/JP2016/084733.
Written Opinion of the International Searching Authority dated Jan. 24, 2017 in corresponding International Patent Application No. PCT/JP2016/084733.

* cited by examiner

| CAPTURED IMAGE DATA IDENTIFICATION INFORMATION | OBSERVATION ANGLE | OBSERVATION POSITION | CAPTURED IMAGE DATA ADDRESS |
|---|---|---|---|
| * * * * * | * * * * * | * * * * * | * * * * * |
| * * * * * | * * * * * | * * * * * | * * * * * |
| * * * * * | * * * * * | * * * * * | * * * * * |

| CAPTURED IMAGE DATA IDENTIFICATION INFORMATION | CORRECT IMAGE DATA ADDRESS | SIMILARITY |
|---|---|---|
| * * * * * | * * * * * | * * * * * |
| * * * * * | * * * * * | * * * * * |
| * * * * * | * * * * * | * * * * * |

IDENTIFICATION DEVICE, IDENTIFICATION METHOD, AND COMPUTER-READABLE MEDIUM INCLUDING IDENTIFICATION PROGRAM

CROSS REFERENCE TO RELATED APPLICATIONS

This application is a continuation application based on a PCT Patent Application No. PCT/JP2016/084733, filed Nov. 24, 2016, whose priority is claimed on Japanese Patent Application No. 2015-231141 filed Nov. 26, 2015, the entire contents of which is hereby incorporated by reference.

BACKGROUND OF THE INVENTION

Field of the Invention

The present invention relates to an identification device, an identification method, an identification program, and a computer-readable medium including an identification program that can be utilized for authenticity determination against counterfeiting of securities such as gift certificates, credit cards, brand items, and equipment parts.

Description of the Related Art

Conventionally, in order to prevent unauthorized use of products due to counterfeiting or duplication, anti-counterfeit media are used for securities such as bills, stock certificates, gift certificates, and credit cards, or products such as pharmaceutical drugs, food items, and luxury brand items. The anti-counterfeit media are directly printed or transferred on the securities. Seals or tags provided with the anti-counterfeit media are attached to the products.

In recent years, however, illicit securities and products with counterfeit or duplicate anti-counterfeit media have been manufactured. It is therefore difficult to determine whether the securities and products are genuine articles or illicit articles (counterfeit articles/duplicate articles) only based on the presence or absence of anti-counterfeit media.

Examples of the anti-counterfeit medium described above include a diffraction grating, a hologram, and the like whose color or pattern varies in accordance with the observation angle. Other examples of the anti-counterfeit medium include an optically variable device (OVD) ink, a pearl pigment, and the like whose color or brightness varies.

Although it can be easily determined whether the anti-counterfeit medium is authentic or fake by comparison with an authentic anti-counterfeit medium or visual inspection by experts, it is difficult for a general user to determine the authenticity of the anti-counterfeit medium easily and visually.

When the authenticity of the anti-counterfeit medium cannot be visually determined, a special authenticity determination device (for example, refer to Japanese Patent No. 3865763) is utilized which can strictly control the observation angle and observation position of an imaging device with respect to the anti-counterfeit medium.

However, since handling of the authenticity determination device requires expert knowledge and special equipment, it is difficult for a general user to determine the authenticity of the anti-counterfeit medium using such a device.

When determining the authenticity of the anti-counterfeit medium on which the optical change in the observed pattern occurs at a predetermined observation angle, since the optical change in the observed pattern varies in accordance with the observation angle, it is necessary to estimate the observation angle on which an imaging direction of an image-capturing device for observing the anti-counterfeit medium depends. Conventionally, a tilt sensor such as a gyro sensor incorporated in the image-capturing device is used for the estimation of the observation angle.

It is also conceivable that the observation angle and observation position be detected by the tilt sensor or the like, and an image of the anti-counterfeit medium be captured by the image-capturing device at the observation angle and observation position appropriate for determining the authenticity.

However, a general user cannot strictly grasp and control the positional relationship between the image-capturing device and the anti-counterfeit medium. For this reason, it is difficult to capture the anti-counterfeit medium using the image-capturing device from the appropriate observation angle and observation position at which the hologram can be captured.

The observed pattern varies in accordance with the observation angle and observation position of the anti-counterfeit medium relative to the image-capturing device. Therefore, in order to accurately determine the observation angle of the image-capturing device to the anti-counterfeit medium, the angle and position of each of the image-capturing device and the anti-counterfeit medium need to be detected. Thus, tilt sensors need to be mounted on both the imaging device and the anti-counterfeit medium.

In addition, a method is also conceivable in which the anti-counterfeit medium is imaged at a predetermined observation angle by the imaging device as a captured image, the correct image of the anti-counterfeit medium is calculated from the observation angle of the anti-counterfeit medium with respect to the imaging device, and the calculated correct image is compared with the anti-counterfeit medium on captured image data.

However, in such a method, if the captured image data does not coincide with the condition for enabling authenticity determination in comparison with the anti-counterfeit medium, for example, if the observation angle available for calculating the correct image does not coincide with the observation angle at which the image is captured, it is necessary to reshoot a captured image. Furthermore, a general user who does not know an appropriate imaging method cannot make the captured image data to coincide with the condition and, in some cases, repeatedly captures images that do not meet the authenticity determination condition. In that case, the authenticity cannot be easily determined.

The present invention has been made in consideration of the above circumstances, and provides an identification device, an identification method, an identification program, and a computer-readable medium including an identification program capable of easily capturing an image for use in the authenticity determination (identification as to whether authentic or fake) at an appropriate observation angle and observation position using a simple image-capturing device such as a general-purpose digital camera to determine the authenticity of an anti-counterfeit medium, without using a conventional special authenticity determination device and without depending on the installation state of the anti-counterfeit medium.

SUMMARY OF THE INVENTION

A first aspect of the present invention is an identification device that performs authenticity determination on an article with an anti-counterfeit medium attached, the identification device including: an imaging condition determinator configured to determine an imaging condition as to whether or not an optical change in the anti-counterfeit medium is imageable from an observation angle that is an angle of captured image data in an imaging direction with respect to a reference line on an observation object surface of the anti-counterfeit medium being designed such that an observed pattern of light varies as the observation angle varies; a similarity calculator configured to obtain similarity between the captured image data and correct image data generated from the optical change corresponding to the observation angle when it is determined that the optical change is imageable under the imaging condition; and an authenticity determinator configured to perform authenticity determination as to whether or not the anti-counterfeit medium is correct based on whether or not the similarity exceeds a preset similarity threshold.

A second aspect of the present invention is the identification device according to the first aspect, in which the imaging condition determinator determines the imaging condition for pieces of the captured image data sequentially input as frames of a moving image.

A third aspect of the present invention is the identification device according to the first or second aspect, in which the authenticity determinator determines that the anti-counterfeit medium is correct when the number of pieces of the captured image data determined to be authentic from among the predetermined number of pieces of the captured image data is equal to or greater than a preset number.

A fourth aspect of the present invention is the identification device according to any one of the first to third aspects, in which the imaging condition determinator determines whether or not the optical change is imageable based on whether or not luminance of light input from the anti-counterfeit medium exceeds a preset similarity threshold.

A fifth aspect of the present invention is the identification device according to any one of the first to fourth aspects, in which the imaging condition determinator determines that the anti-counterfeit medium is not authentic when it is determined that the optical change is not imageable.

A sixth aspect of the present invention is the identification device according to any one of the first to fifth aspects, further including an imaging controller configured to instruct to move an imaging device to an observation angle at which the optical change is observable when it is determined that the optical change is not imageable under the imaging condition.

A seventh aspect of the present invention is the identification device according to any one of the first to sixth aspect, the authenticity determinator comparing different pieces of captured image data with pieces of correct image generated by the optical change corresponding to the observation angle of the pieces of captured image data, and performing the authenticity determination based on whether or not the similarity between each of the pieces of captured image data and the corresponding piece of correct image data exceeds the similarity threshold.

An eighth aspect of the present invention is the identification device according to any one of the first to seventh aspects, further including an observation angle estimator configured to obtain, by a predetermined coordinate transformation formula, a position and an imaging direction with which the captured image data was captured in a three-dimensional space in which the anti-counterfeit medium was placed when the captured image data was captured and obtain the observation angle according to the position and the imaging direction.

A ninth aspect of the present invention is an identification method of performing authenticity determination on an article with an anti-counterfeit medium attached, the identification method including: determining, by an imaging condition determinator, an imaging condition as to whether or not an optical change in the anti-counterfeit medium is imageable from an observation angle that is an angle of captured image data in an imaging direction with respect to a reference line on an observation object surface of the anti-counterfeit medium being designed such that an observed pattern of light varies as the observation angle varies; obtaining, by a similarity calculator, similarity between the captured image data and correct image data generated from the optical change corresponding to the observation angle when it is determined that the optical change is imageable under the imaging condition; and performing, by an authenticity determinator, authenticity determination as to whether or not the anti-counterfeit medium is correct based on whether or not the similarity exceeds a preset similarity threshold.

A tenth aspect of the present invention is an identification program that is configured to cause a computer to execute an authenticity determination method on an article with an anti-counterfeit medium attached, the authenticity determination method including: determining an imaging condition as to whether or not an optical change in the anti-counterfeit medium is imageable from an observation angle that is an angle of captured image data in an imaging direction with respect to a reference line on an observation object surface of the anti-counterfeit medium being designed such that an observed pattern of light varies as the observation angle varies; obtaining similarity between the captured image data and correct image data generated from the optical change corresponding to the observation angle when it is determined that the optical change is imageable under the imaging condition; and performing authenticity determination as to whether or not the anti-counterfeit medium is correct based on whether or not the similarity exceeds a preset similarity threshold.

An eleventh aspect of the present invention is a computer-readable medium including an identification program that is configured to cause a computer to execute an authenticity determination method on an article with an anti-counterfeit medium attached, the authenticity determination method including: determining an imaging condition as to whether or not an optical change in the anti-counterfeit medium is imageable from an observation angle that is an angle of captured image data in an imaging direction with respect to a reference line on an observation object surface of the anti-counterfeit medium being designed such that an observed pattern of light varies as the observation angle varies; obtaining similarity between the captured image data and correct image data generated from the optical change corresponding to the observation angle when it is determined that the optical change is imageable under the imaging condition; and performing authenticity determination as to whether or not the anti-counterfeit medium is correct based on whether or not the similarity exceeds a preset similarity threshold.

The above aspects according to the present invention can provide an identification device, an identification method, and a computer-readable medium including an identification program capable of easily capturing an image for use in authenticity determination (identification as to whether authentic or fake) at an appropriate observation angle and observation position using a simple image-capturing device such as a general-purpose digital camera to determine the authenticity of an anti-counterfeit medium, without using a conventional special authenticity determination device and without depending on the installation state of the anti-counterfeit medium.

DETAILED DESCRIPTION OF THE PREFERRED EMBODIMENTS

EMBODIMENTS FOR CARRYING OUT THE INVENTION

First Embodiment

Hereinafter, a first embodiment of the present invention will be described with reference to the drawings.

Figure 1:
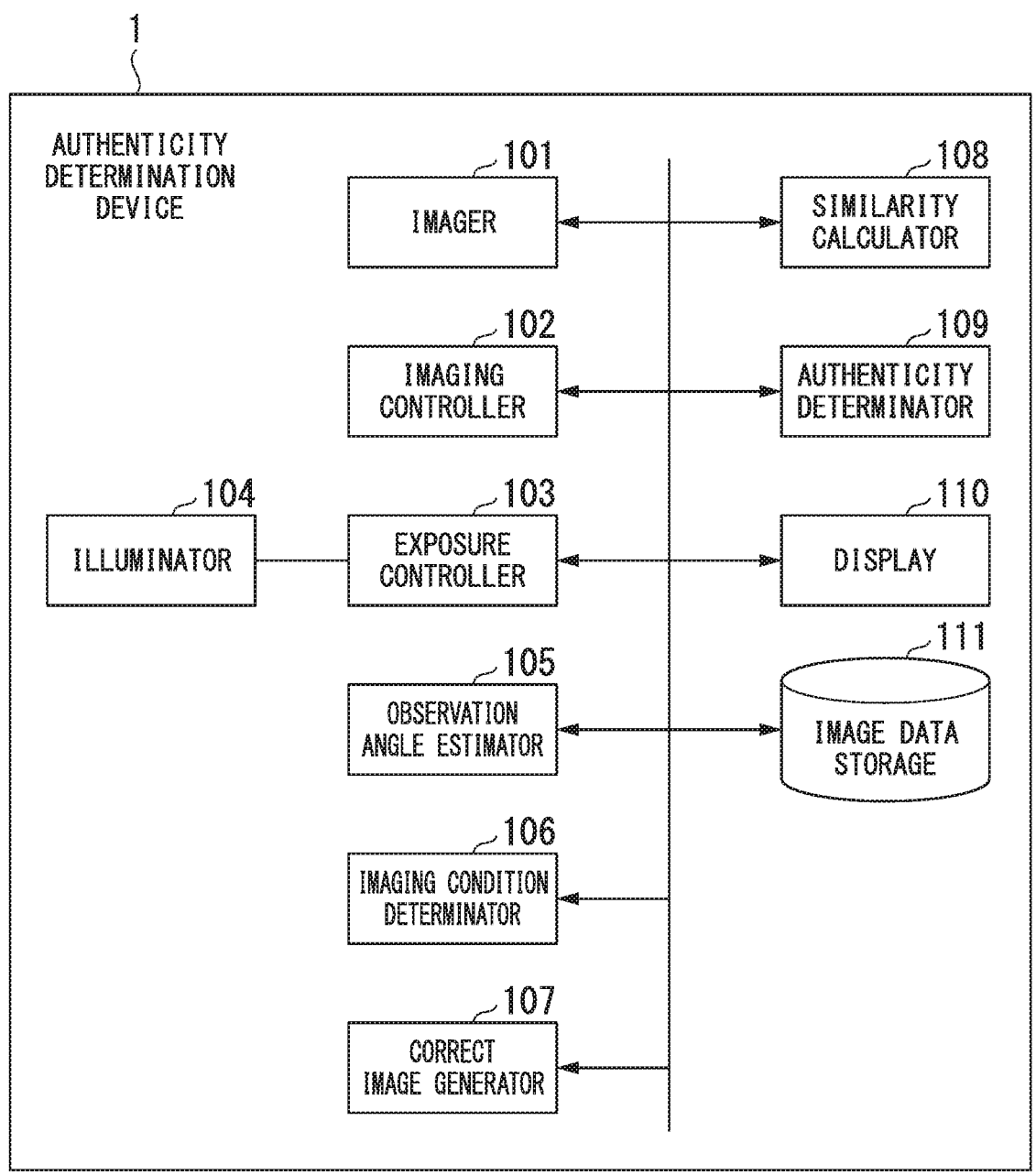
FIG. 1 is a block diagram illustrating an exemplary configuration of an identification device (authenticity determination device) according to a first embodiment.

FIG. 1 is a block diagram illustrating an exemplary configuration of an identification system (authenticity determination device, or identification device) according to the first embodiment. In FIG. 1, the authenticity determination device 1 includes an imager 101, an imaging controller 102, an exposure controller 103, an illuminator 104, an observation angle estimator 105, an imaging condition determinator 106, a correct image generator 107, a similarity calculator 108, an authenticity determinator 109, a display 110, and an image data storage 111. The identification system of the present embodiment is configured so that the imager 101 and the illuminator 104 are integrated, and configured to be used for an authenticity determination process for an anti-counterfeit medium that serves as a retroreflector.

The imager 101 is, for example, a camera or the like provided with an image sensor such as a charge-coupled device (CCD) or a complementary metal oxide semiconductor (CMOS), and sequentially outputs an image of the object in time series, which is captured under the capture mode of the video, as captured image data to the observation angle estimator 105. In other words, the imager 101 outputs each frame of the video to the observation angle estimator 105 as captured image data.

The imaging controller 102 controls imaging conditions for the imager 101 such as the depth of focus and the sensitivity of an imaging sensor (International Organization for Standardization (ISO) speed) when the imager 101 captures the captured image data, i.e., an image of a captured pattern (color (wavelength) of light or an image such as a character and a picture) of light (diffracted light) emitted from the anti-counterfeit medium in response to incident light.

The exposure controller 103 controls imaging conditions for the imager 101 such as shutter speed, an aperture value, presence or absence of illumination light, and intensity of illumination light as conditions for imaging related to exposure. The exposure controller 103 also outputs a light-emitting instruction to cause the illuminator 104 to emit imaging light (illumination light) as necessary at the time of imaging in accordance with the brightness around the anti-counterfeit medium to be captured by the authenticity determination device 1.

The illuminator 104 may be not only normal light that continuously irradiates an imaging object with light but also a light-emitting device called a flash or strobe (registered trademark) that irradiates an imaging object with light in a short time. In response to the light-emitting instruction from the exposure controller 103, the illuminator 104 irradiates the object to be captured with light having a predetermined intensity. The imaging controller 102 supplies a control signal indicating the imaging timing to the exposure controller 103. Consequently, as mentioned above, the exposure controller 103 outputs the light-emitting instruction to cause the illuminator 104 to emit the illumination light with which the anti-counterfeit medium is irradiated in response to the control signal indicating the imaging timing supplied from the imaging controller 102.

The observation angle estimator 105 obtains both of an observation position (coordinate values), which is an imaging position in a three-dimensional space where each of pieces of the captured image data sequentially input from the imager 101 was captured to image the anti-counterfeit medium, and an imaging direction of the imager 101 from a coordinate transformation formula (described later). In other words, the observation angle estimator 105 obtains an observation angle of the anti-counterfeit medium in each piece of the captured image data from the obtained observation position and imaging direction.

The observation angle estimator 105 outputs captured image data information including the captured image data and the obtained observation position and observation angle to the imaging condition determinator 106, together with captured image data identification information provided to the captured image data to identify each piece of the captured image data. An observed pattern of light emitted from the anti-counterfeit medium in response to incident light varies depending on the observation angle.

In addition, the observation angle estimator 105 may be configured to temporarily write and store the captured image data information including the captured image data and the obtained observation position and observation angle in a captured image data table in the image data storage 111, together with the captured image data identification information.

An observed pattern of light emitted from the anti-counterfeit medium in response to incident light varies depending on the observation angle. In the case of the above configuration, the imaging condition determinator 106 reads sequentially captured image data stored in the captured image data table in the image data storage 111 from this captured image data table to determine the imaging condition and extracts a captured image to be used for authenticity determination for an anti-counterfeit medium 400.

In the present embodiment, one or a plurality of pieces of the captured image data of the anti-counterfeit medium is captured by the imager 101 at a predetermined focal length. When a plurality of pieces of the captured image data is captured, it is necessary to differentiate the observation angles among respective pieces of the captured image data. As described above, from this one or plurality of pieces of the captured image data that has been captured, the observation angle estimator 105 estimates the observation angle of each piece of the captured image data obtained by imaging the anti-counterfeit medium in the three-dimensional space, using the preset coordinate transformation formula.

The coordinate transformation formula as used herein is generated when the three-dimensional space is reproduced from a plurality of pieces of captured image data (captured image data obtained from a captured calibration board to be described later) in advance as preprocessing for performing the authenticity determination process on the anti-counterfeit medium provided on an authenticity determination object (preparation for performing the authenticity determination process), and two-dimensional coordinate positions of pixels of the plurality of pieces of captured image data are associated with coordinate positions in the three-dimensional space. The coordinate transformation formula generated in advance is written and stored in advance in the image data storage 111 in association with each authenticity determination object.

Figures 2, 3:
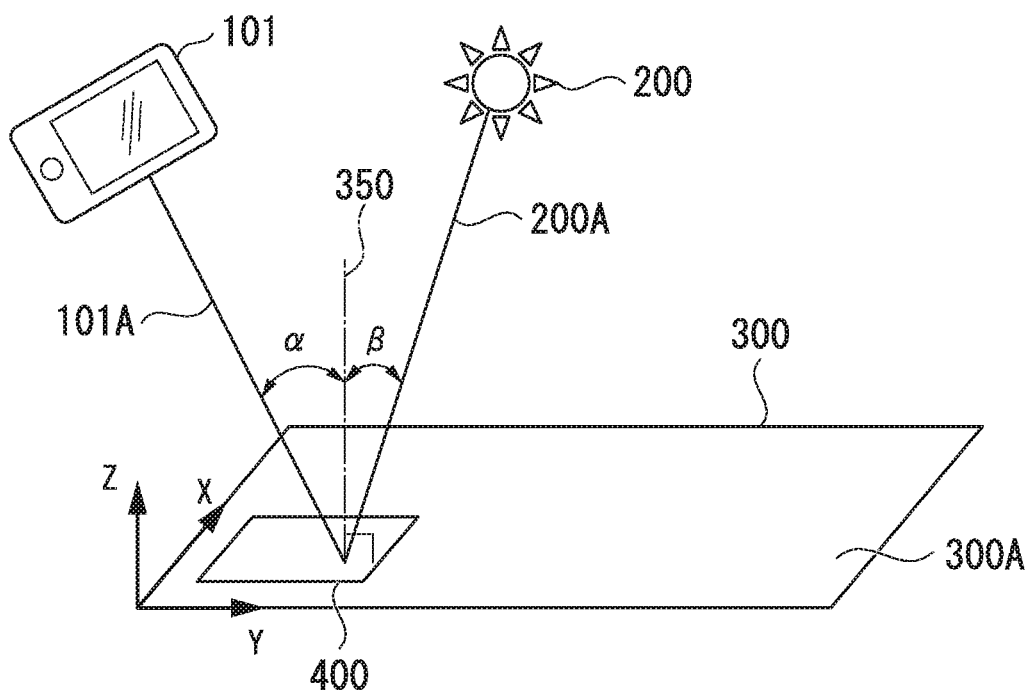
FIG. 2 is a diagram illustrating an exemplary configuration of a captured image data table in an image data storage 111.
FIG. 3 is a drawing showing an observation angle of an imager 101 to an anti-counterfeit medium.

FIG. 2 is a diagram illustrating an exemplary configuration of the captured image data table in the image data storage 111. Each of the captured image data identification information, the observation angle and the observation position of the captured image data corresponding to this captured image data identification information, and an captured image data address are written and stored in the captured image data table of FIG. 2. The captured image data identification information is information for identifying each piece of the captured image data.

When an authenticity determination object is arranged with any vertex or coordinate point of the authenticity determination object as the origin in a coordinate system in the three-dimensional space (hereinafter referred to as a three-dimensional coordinate system), the above-described observation angle is, for example, an angle between the imaging direction of the imager 101 and a normal (reference line) with respect to a surface of the anti-counterfeit medium at the time of capturing the captured image data. The observation position indicates a coordinate position in the three-dimensional space, at which the imager 101 imaged the authenticity determination object. The captured image data address indicates the address of a region in the image data storage 111 in which each piece of the captured image data is stored and serves as an index for reading the captured image data.

FIG. 3 is a drawing for explaining the observation angle of the imager 101 to the anti-counterfeit medium. In FIG. 3, for example, the anti-counterfeit medium 400 is used for the prevention of counterfeiting and duplication of securities such as vouchers such as bills, stock certificates, and gift certificates or credit cards, or products such as pharmaceutical drugs, food items, and luxury brand items. The anti-counterfeit medium 400 is directly printed or transferred on a voucher or security, or printed or transferred on a seal or tag attached to a product (or a product package).

In FIG. 3, the anti-counterfeit medium 400 is provided on a surface of a credit card 300. In the present embodiment, examples of the anti-counterfeit medium 400 include a diffraction grating, a hologram, and the like whose color or pattern varies in accordance with the observation angle. Alternatively, an optically variable device (OVD) ink, a pearl pigment, and the like whose color or brightness varies in accordance with the observation angle can be used (details will be described later). A light source (also referred to as illumination) 200 irradiates the anti-counterfeit medium 400 with imaging light at an irradiation angle 3 which is an angle between a light irradiation direction 200A and a normal 350. In response to receiving the imaging light, the anti-counterfeit medium emits a predetermined pattern of light. The pattern of light emitted from the anti-counterfeit medium in response to the irradiation light varies in accordance with each of an observation angle α and the irradiation angle 3.

Here, the anti-counterfeit medium 400 will be described in detail.

The anti-counterfeit medium 400 may be a kind of hologram that emits various types of diffracted light using a diffraction structure. In this case, various types of holograms such as reflection, transmission, phase, and volume holograms can be used.

Hereinafter, in particular, an example of a relief structure having an uneven structure will be described in detail.

Figure 4:
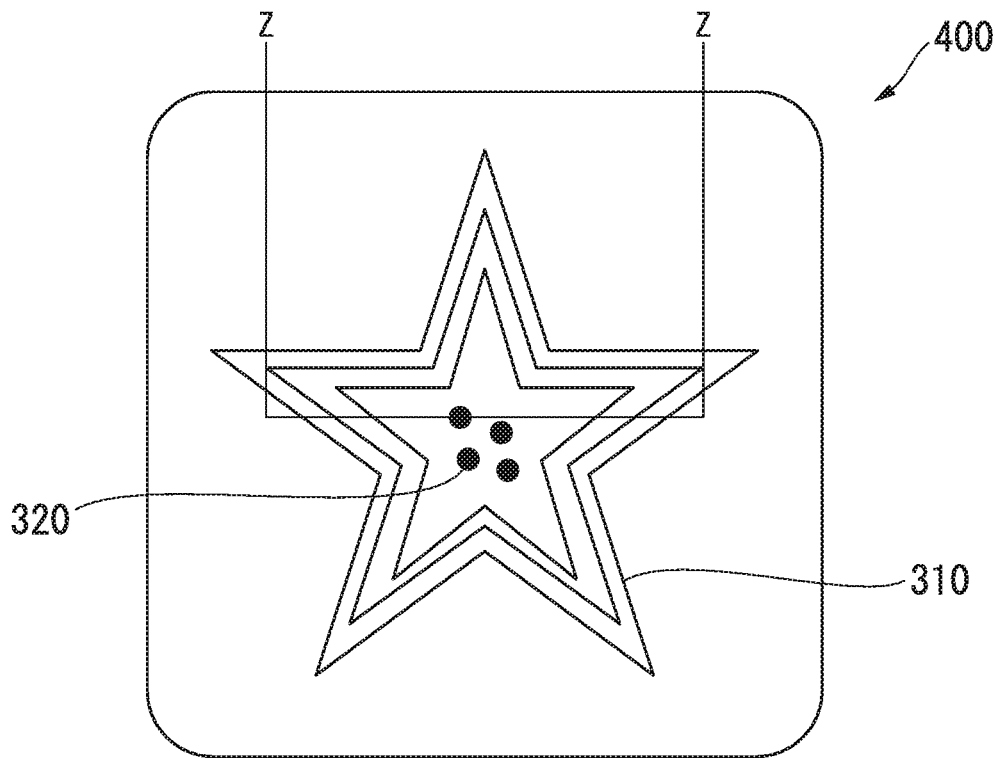
FIG. 4 is a plan view schematically illustrating the anti-counterfeit medium according to the first embodiment.
Figure 5:
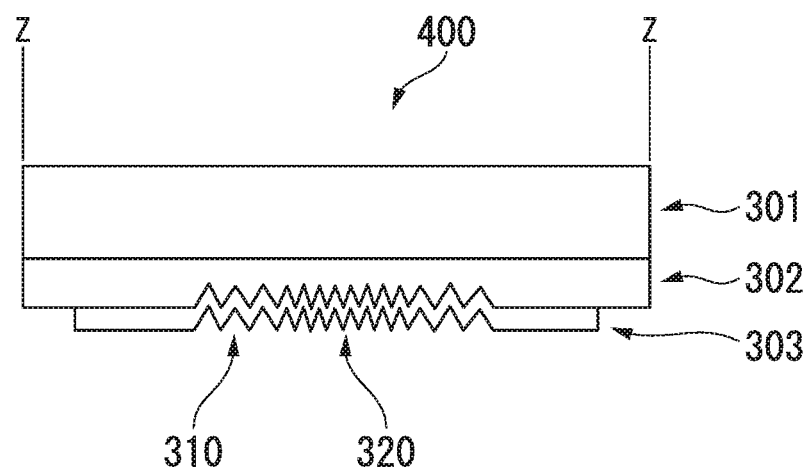
FIG. 5 is a cross-sectional view schematically illustrating a cross-section taken along line Z-Z of the anti-counterfeit medium illustrated in FIG. 4.

As a method of forming an uneven structure such as a first uneven structure portion 310 and a second uneven structure portion 320 formed on a relief structure formation layer 302 illustrated in FIGS. 4 and 5, various methods such as radiation curing molding, extrusion molding, and hot press molding can be employed using a metallic stamper or the like.

The first uneven structure portion 310 has a groove-like structure including a recessed or projecting portion. As the first uneven structure portion 310, an uneven structure can be used such as what is called a relief diffraction grating structure or a directional scattering structure having a region in which a plurality of linear recessed or projecting portions aligned in the same direction are formed and including a combination of a plurality of regions in which the directions are different from each other.

In general, most of the ordinary diffraction gratings used for display bodies have a spatial frequency of 500 to 1600 lines/mm, and can display different colors to a user who observes the diffraction grating in a certain direction in accordance with the spatial frequency or direction of the diffraction grating.

Figures 8, 9:
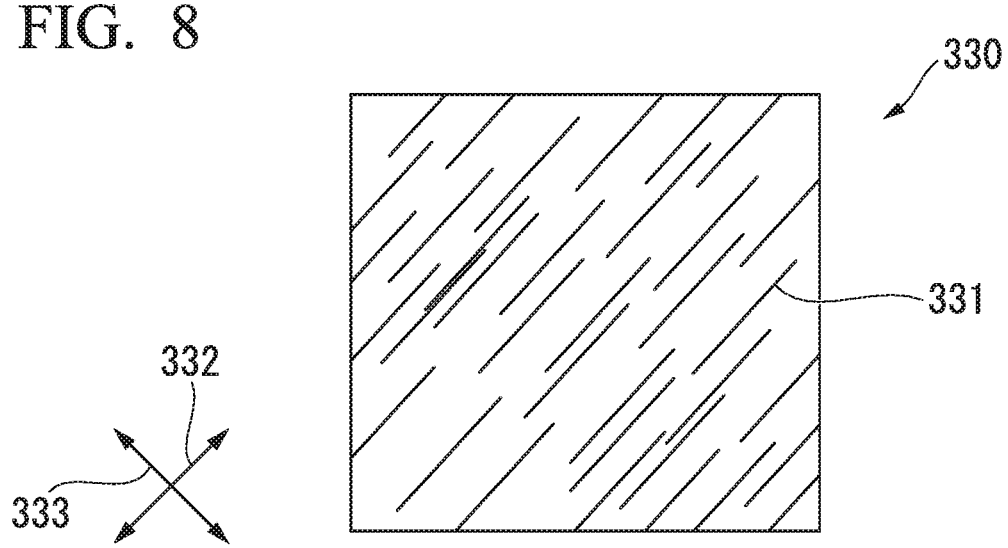
FIG. 8 is a perspective view illustrating an example of a first uneven structure portion of the anti-counterfeit medium according to the first embodiment.
FIG. 9 is a diagram illustrating an exemplary configuration of a captured image data table and a captured image data table for authenticity determination in an image data storage 111.

In contrast, the directional scattering structure includes a plurality of light scattering structures 331 oriented in the same orientation direction 332 within a specific segment or cell as illustrated in FIG. 8. Each of these light scattering structures 331 is linearly arranged substantially in parallel with the other light scattering structures within the specific segment or cell.

However, the light scattering structures 331 do not need to be completely parallel with each other, and as long as the region of the directional scattering structure 330 has a sufficient anisotropic scattering capability, a longitudinal direction of a part of the light scattering structures 331 and a longitudinal direction of another part of the light scattering structures 331 may intersect.

Owing to the above structure, when the region including the directional scattering structure 330 is irradiated with light in an oblique direction perpendicular to the orientation direction 332, and the region is observed from the front, the region looks relatively bright due to a high light scattering capability.

In contrast, when the region including the directional scattering structure 330 is irradiated with light in an oblique direction perpendicular to a light scattering axis 333, and the region is observed from the front, the region looks relatively dark due to a low light scattering capability.

Therefore, by arbitrarily providing the orientation direction 332 in each segment or cell including the light scattering structure 331, a pattern including a combination of a relatively bright portion and a relatively dark portion is formed, and inversion of light and dark portions is observed when the pattern is observed from different observation positions or irradiated with light from different positions.

The first uneven structure portion 301 can have one or a combination of the structures such as the relief diffraction grating structure and the directional scattering structure, but the first uneven structure portion 301 is not necessarily limited to this example.

Figure 6:
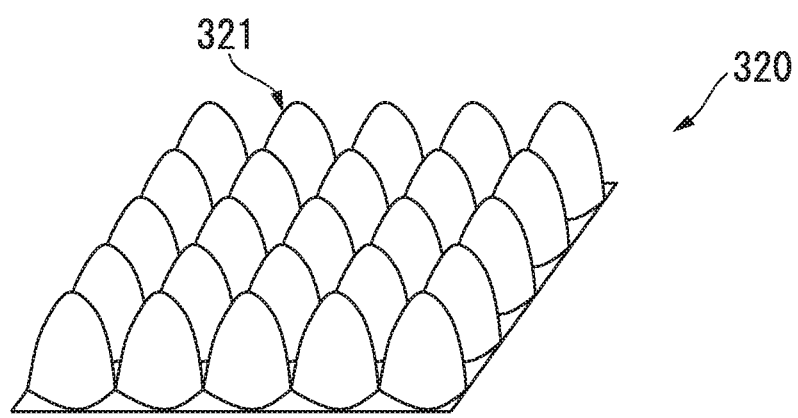
FIG. 6 is a perspective view illustrating an example of a second uneven structure portion of the anti-counterfeit medium according to the first embodiment.
Figure 6:
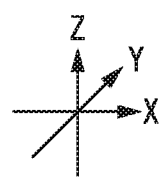

An exemplary structure that can be adopted for the second uneven structure portion 320 is illustrated in FIG. 6 as a perspective view.

A plurality of projecting portions 321 are provided on the second uneven structure portion 320 illustrated in FIG. 6. Although only the plurality of projecting portions 321 constitutes the second uneven structure portion 320, this is merely an example. In the present embodiment, the second uneven structure portion 320 can be formed using a plurality of recessed portions.

The surface area of a single recessed or projecting portion provided on the second uneven structure portion 320 according to the present embodiment is preferably equal to or greater than 1.5 times the occupied area required for arranging a single recessed or projecting portion on a surface of the relief structure formation layer 302.

If a single recessed or projecting portion has a surface area of equal to or greater than 1.5 times the occupied area, a low reflection property and a low scattering property can be successfully obtained. In other words, this configuration is preferable because the color tone of the second uneven structure portion is apparently different from that of the first uneven structure portion, and the second uneven structure portion is easy to recognize when captured by the imager 101. In contrast, a single recessed or projecting portion having a surface area of less than 1.5 times the occupied area is not preferable since such a recessed or projecting portion has a high reflectance.

In addition, each of the plurality of recessed or projecting portions on the second uneven structure portion 320 formed on the relief structure formation layer 302 desirably has a forward tapered shape.

As used herein, the forward tapered shape refers to such a shape that the cross-sectional area parallel with a base surface of the recessed or projecting portion is formed so as to decrease from the proximal end toward the distal end of the recessed or projecting portion. More specifically, examples of the forward tapered shape can include a conical shape, a pyramid shape, an elliptical conical shape, a columnar or cylindrical shape, a prismatic or prismatic cylindrical shape, a truncated conical shape, a truncated pyramid shape, a truncated elliptical conical shape, a conical shape joined to a column or cylinder, a pyramid shape joined to a prism or prismatic cylinder, a hemisphere, a semi-ellipsoid, a bullet shape, a bowl shape, and the like.

Figure 7:
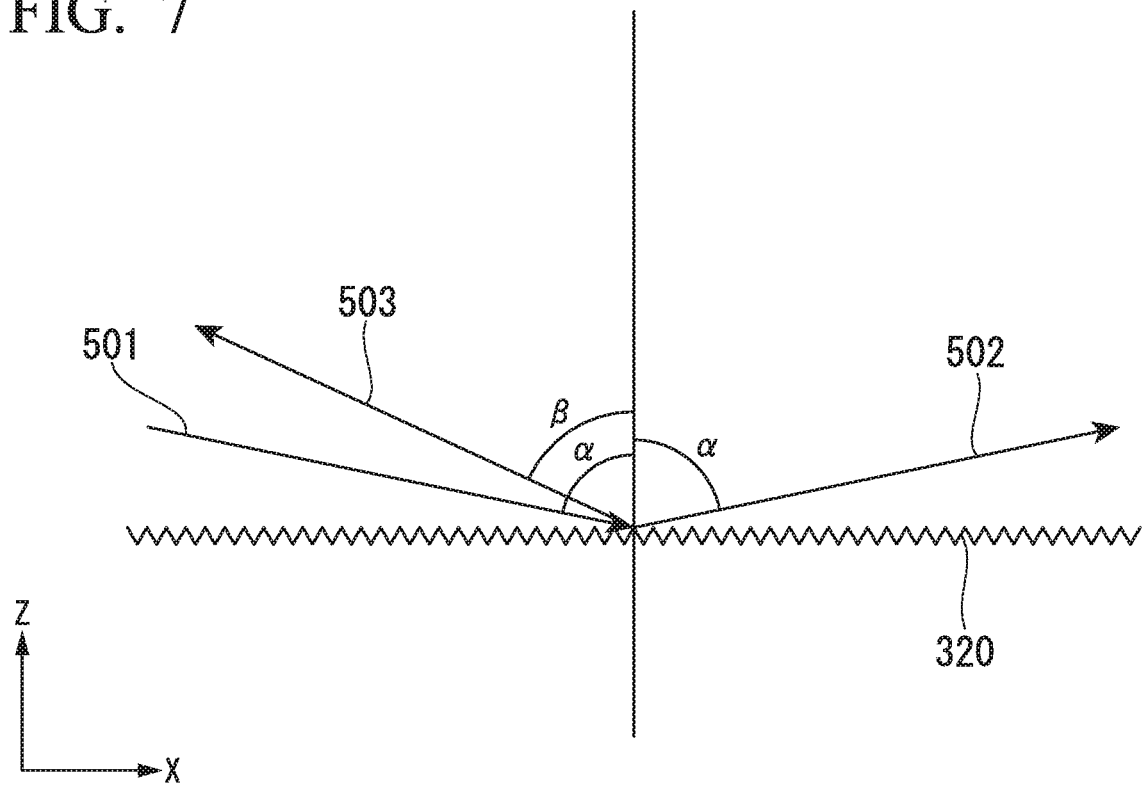
FIG. 7 is a drawing schematically illustrating how the second uneven structure portion emits diffracted light.

As illustrated in FIG. 6, when the distance between the centers of the adjacent recessed or projecting portions on the second uneven structure portion 320 is constant, the second uneven structure portion 320 emits diffracted light in a specific direction with respect to a traveling direction of incident light 501 in response to being irradiated with light as illustrated in FIG. 7.

Generally, diffracted light can be expressed by the following formula.

$$d(\sin \alpha + \sin \beta) = n\lambda \quad (1)$$

In Formula (1), d represents the distance between the centers of the recessed or projecting portions, and $\lambda$ represents the wavelength of the incident light and the diffracted light. In addition, $\alpha$ represents an incident angle of the incident light, $\beta$ represents an emission angle of the diffracted light, and n is an order. Since the most typical diffracted light is first-order diffracted light, n=1 can be satisfied here.

The incident angle $\alpha$ can be considered the same as an emission angle of zeroth-order diffracted light, that is, specularly reflected light. With regard to $\alpha$ and $\beta$, a clockwise direction from a normal direction to the display body, that is, the Z axis in FIG. 5, is regarded as a positive direction. Therefore, Formula (1) is expressed as follows.

$$d(\sin \alpha - \sin \beta) = \lambda \quad (2)$$

Accordingly, when the distance d between the centers of the recessed or projecting portions and the incident angle, that is, the emission angle $\alpha$ of the zeroth-order diffracted light, are constant, the emission angle $\beta$ of first-order diffracted light 503 varies in accordance with a wavelength $\lambda$ as is apparent from Formula (2). Therefore, when the illumination light is white light, and the observation angle for the uneven structure portion is changed, the color captured by the imager 101 varies.

Since the second uneven structure portion 320 has the forward tapered shapes in which the distance between the centers of the recessed or projecting portions is 400 nm or less, the second uneven structure portion 320 looks almost black when captured in the normal direction, whereas under specific conditions, that is, under the environment where the incident angle $\alpha$ of white light is 60° to 90°, the emission angle 130 of the first-order diffracted light 503 of light having a specific wavelength can be designed in the vicinity of the incident angle.

For example, when the incident angle α=60° and d=340 nm are satisfied, the emission angle |β| for λ=600 nm is about 64°.

In contrast, since the first uneven structure portion 310 is what is called a diffraction grating structure or the like, it is difficult to set the emission angle of the first-order diffracted light in the vicinity of the incident angle.

Therefore, in the identification operation by the authenticity determination device 1, a light source 200 and the imager 101 are provided relatively close to each other, whereby a clear change in the color of the second uneven structure portion 320 can be captured under specific conditions.

For example, the anti-counterfeit medium 400 may be configured to utilize surface plasmon propagation generated by nanometer-size microscopic pores, microscopic structures or the like provided on its surface, or configured to utilize a structural color for controlling the color of reflected or transmitted light with respect to incident light, with the depth of the uneven structure controlled.

For example, the anti-counterfeit medium 400 may be configured to utilize a retroreflective property of a microsphere or a spherical structure, configured as an angle control mirror that reflects/transmits incident light only in a specific direction using a gradient formed on a surface structure of a minute region to provide a reflective property, or configured as a printed material having an uneven shape provided by means of intaglio printing.

For example, the anti-counterfeit medium 400 may be configured to include a large number of tall wall surfaces in a narrow region, which are utilized in an anti-peeping film or the like, to utilize a structure that limits the viewing area, configured to utilize a parallax barrier technique for limiting the viewing area with fine lines provided on a screen at specific intervals so that an image formed at the back of the screen looks different, or configured to utilize a lenticular lens, a microlens array or the like so that an image formed at the back of the lens looks different.

For example, the anti-counterfeit medium 400 may be configured to include, by means of printing or the like, a pearl pigment made from mica coated with a metal oxide.

For example, the anti-counterfeit medium 400 may be configured to utilize a multi-layer thin film including a plurality of layers of thin films made of transparent materials or metals having different refractive indices, so that the color varies due to the interference phenomenon in accordance with the reflection or transmission angle of incident light, configured to include flakes of the crushed multi-layer thin film as a pigment by means of printing or the like, configured to include, by means of printing or the like, particles made of microparticles coated with thin films through a chemical process or the like to cause the interference phenomenon, or configured to utilize a liquid crystal material such as cholesteric liquid crystal immobilized with a polymer or the like. As the liquid crystal material, a liquid crystal material provided in a planar form may be used, or a pigment made from a liquid crystal material using a crushing process and provided by means of printing or the like may be used.

For example, the anti-counterfeit medium 400 may be configured to use a magnetic orientation material made of a magnetic substance such as an iron oxide, a chromium oxide, cobalt, ferrite, and the like oriented by magnetic force and provided in a planar form, so that reflected or transmitted light has directivity, configured to include, through the chemical process or the like as mentioned above, a multi-layer film with a core of the magnetic orientation material, or configured to utilize an optic effect generated by nanometer-size particles such as silver nanoparticles and quantum dots.

Returning to FIG. 3, the normal 350 is a normal indicating a surface direction of a surface 300A of the credit card 300. The observation angle α is an angle between an imaging direction 101A of the imager 101 and the normal 350. Here, for example, assuming that a direction parallel with the normal 350 is the z axis, the observation angle estimator 105 arranges the credit card in the three-dimensional coordinate system so that the respective sides of the credit card 300 are parallel with the x and y axes. For example, the credit card 300 is arranged on a two-dimensional plane including the x and y axes in the three-dimensional coordinate system so that any of the vertices formed by the respective sides of the credit card 300 coincides with the origin O of the three-dimensional coordinate system. Therefore, a thickness direction of the credit card 300 is parallel with the z axis. The three-dimensional shape of the credit card 300 is written and stored in advance in the image data storage 111 together with the above-mentioned coordinate transformation formula as known information.

When obtaining the observation angle of each piece of the captured image data, the observation angle estimator 105 reads the captured image data from the image data storage 111 and associates the coordinates of the three-dimensional shape of the credit card 300 in the three-dimensional coordinate system with each pixel (coordinates) of the captured image data (two-dimensional coordinate system) using the coordinate transformation formula, thereby obtaining an imaging position of the captured image data in the three-dimensional coordinate system in the three-dimensional space and the imaging direction of the captured image data from the imaging position. At this time, as mentioned above, the observation angle estimator 105 arranges the credit card 300 in a three-dimensional space so that the normal 350 is parallel with the z axis and each side is parallel with the x or y axis with any vertex of the three-dimensional shape of the credit card 300 as the origin in the three-dimensional coordinate system.

The observation angle estimator 105 obtains the imaging position and imaging direction of the captured image data of the imager 101 in the three-dimensional coordinate system with the three-dimensional shape of the credit card 300 as a reference. Consequently, the observation angle estimator 105 obtains the observation angle α between the normal 350 and the imaging direction of the imager 101. When the imaging condition determinator 106 determines that imaging with the obtained observation angle and observation position is possible, the imaging condition determinator 106 writes and stores the captured image data in a predetermined region of the image data storage 111, while writing and storing each of the captured image data address that is the address of the predetermined region, the captured image data identification information of the captured image data, and the captured image data address of the captured image data in the captured image data table in the image data storage 111.

In the present embodiment, camera calibration needs to be performed on the imager 101 in advance. In the camera calibration, the calibration board having a known three-dimensional shape is captured in advance once or multiple times within an imaging region, and using one or more pieces of captured image data, a plurality of coordinate points, that is, coordinate points in a three-dimensional coordinate system in the three-dimensional space and coordinate points (two-dimensional pixels) in a two-dimensional coordinate system of the captured image data, are correlated with each other. Consequently, the coordinate transformation formula indicating the relative positional relationship (hereinafter referred to as an external parameter) between the imager 101 and the calibration board is estimated, and the optical center of the imager 101, a beam incident direction vector at each pixel (two-dimensional pixel) of the imager 101, distortion of a lens of the imager 101, and the like (hereinafter referred to as an intrinsic camera parameter of the imager 101) are estimated.

In other words, in the present embodiment, in order for the observation angle estimator 105 described below to estimate the observation angle for the captured image data, a global coordinate system (three-dimensional coordinate system) is reconstructed from the two-dimensional images obtained from the calibration board captured by the imager 101 in advance in a plurality of different viewpoint directions, that is, reconstructed from multi-view captured image data. The coordinate transformation formula indicating the correspondence relationship between a coordinate point of a pixel in the reconstructed three-dimensional coordinate system and a coordinate point of the same pixel in the two-dimensional coordinate system of the captured image data captured by the imager 101 is obtained at the time of camera calibration.

As mentioned above, with regard to the estimation of the observation angle according to the present embodiment, the camera calibration is performed on the imager 101 in advance, the intrinsic camera parameter of the imager 101 is known when the authenticity determination process for the anti-counterfeit medium is executed in the identification system, and the three-dimensional shapes of the authenticity determination object and the anti-counterfeit medium are also known. Consequently, pieces of captured image data of the anti-counterfeit medium are captured from a plurality of different positions, and a plurality of pieces of corresponding point information between coordinate points in the three-dimensional coordinate system and pixels in the two-dimensional coordinate system of the pieces of captured image data are obtained using the coordinate transformation formula. The relative positional relationship between the imager 101 and the anti-counterfeit medium can be estimated from a plurality of corresponding point coordinates. Similarly, in a case where the anti-counterfeit medium is captured only once, a plurality of pieces of corresponding point information between coordinate points in the three-dimensional coordinate system and pixels in the two-dimensional coordinate system are obtained from the single piece of captured image data using the coordinate transformation formula. The relative positional relationship between the imager 101 and the anti-counterfeit medium can be estimated from a plurality of corresponding point coordinates. In other words, the observation position and observation angle (imaging direction) of the imager 101 at which the anti-counterfeit medium has been captured can be estimated.

In the present embodiment, as an example of the camera calibration, the technique proposed by Z. Zhang (Z. Zhang, "A flexible new technique for camera calibration", IEEE Transactions on Pattern Analysis and Machine Intelligence, Vol. 22, No. 11, pages 1330-1334, 2000), which is one of the well-known techniques, can be applied to the estimation of the observation angle at which the captured image data has been captured. However, in a case where the observation angle is estimated using the technique proposed by Z. Zhang, the captured image data to be input to the identification system needs to be captured at a focus similar to the focus fixed at the time of camera calibration (and desirably at the same focus).

Returning to FIG. 1, the imaging condition determinator 106 sequentially reads the captured image data information in the image data storage 111 from the observation angle estimator 105. The imaging condition determinator 106 determines whether or not the observation position and the observation angle estimated by the observation angle estimator 105 coincide with predefined set observation position and set observation angle, respectively. When the observation position and the observation angle with which the captured image data was captured do not coincide with the predefined set observation position and set observation angle, the imaging condition determinator 106 outputs a notification to the imaging controller 102 on performing control for adjusting the observation position and the observation angle to capture the captured image data. With this control, the imaging controller 102 obtains the difference between the current imaging position and observation angle and the set imaging position and set observation angle, respectively, and displays a guide on the display 110 as to which position to move to.

In the display of the guide, for example, a guide represented by a dotted line is displayed on a through image, the imaging device is moved so that the shape of the anti-counterfeit medium shown in the through image matches the guide, and then the imaging of the video is started. A configuration for guiding in this manner so that the anti-counterfeit medium can be imaged from a preset specific observation angle and observation position may be employed.

With the above configuration, a general user can intuitively understand how to image the anti-counterfeit medium at a preset observation angle and observation position by information on how to move the imaging device from the current state. Therefore, it is possible to smoothly perform the process of imaging the anti-counterfeit medium, and the authenticity determination can be easily performed.

When the observation position and the observation angle coincide with the predefined observation position and observation angle, respectively, the imaging condition determinator 106 determines whether or not the diffracted light having a predetermined luminance preset for the observation position and the observation angle is detected from the captured image in which the anti-counterfeit medium 400 is imaged. When the diffracted light having the preset luminance is not detected at the preset observation position and observation angle, the imaging condition determinator 106 notifies the authenticity determinator 109 that the diffracted light from the anti-counterfeit medium 400 is not incident on the predetermined observation position at the predetermined observation angle.

In addition, the imaging condition determinator 106 determines, for example, whether or not the entire shape of the anti-counterfeit medium 400 is imaged in the captured image data, whether or not the captured image data is in focus, and whether or not the distribution of the luminance histogram (described later) is appropriate.

When it is determined that all of the imaging conditions such as the observation position, the observation angle, the luminance of the diffracted light, the focal length, and the exposure condition can be used for the authenticity process, the imaging condition determinator 106 writes and stores the captured image data in the captured image data table for authenticity determination in the image data storage 111 as captured image data that can be used for the authenticity process. At this time, the imaging condition determinator 106 writes the captured image data in the image data storage 111, and writes an address at which the captured image data was written in the column for the captured image data address of a record corresponding to the captured image data in the captured image data table for authenticity determination.

FIG. 9 is a diagram illustrating an exemplary configuration of the captured image data table for authenticity determination in the image data storage 111. In the captured image data table for authenticity determination of FIG. 9, the captured image data, a correct image data address indicating an initial address of the region in which the correct image data is stored, and the similarity between the captured image data and the correct image data are written and stored for the captured image data in association with each other.

In the captured image data table for authenticity determination, the captured image data identification information serves as identification information for identifying the captured image data. The correct image data address indicates the address of a region in the image data storage 111 in which each piece of the captured image data is stored and serves as an index for reading the correct image data from the image data storage 111. The correct image data stored at the correct image data address is image data to be compared with the corresponding captured image data. The similarity is a numerical value indicating the degree of similarity between the captured image data and the correct image data.

Returning to FIG. 1, the correct image generator 107 generates the correct image data to be compared with the captured image data recorded by the imaging condition determinator 106. The correct image data is image data observed from the same observation angle as the captured image data, and obtained from simulated image data corresponding to the structure of the anti-counterfeit medium 400 or captured image data obtained from the anti-counterfeit medium 400 captured in advance. As described above, the anti-counterfeit medium 400 is configured to be formed of a diffraction grating or holography, configured to be formed of an OVD ink or a pearl pigment including a pigment made from mica coated with a metal oxide, configured to be formed of repeatedly laminated layers having different refractive indices, or configured to be formed of cholesteric liquid crystal.

Therefore, the correct image generator 107 generates the correct image data in accordance with each of the above cases. For example, in the case where the anti-counterfeit medium 400 is formed using the diffraction grating, the correct image data is calculated and generated through simulation based on information on the design of the diffraction grating using a correct image generation function including the observation angle as a parameter. The correct image generator 107 writes and stores the generated correct image data in the image data storage 111, and sets an initial address of the region in which the data is written as a correct image data address. The correct image generator 107 also writes and stores the correct image data address described above in a captured image data table for authenticity determination of the image data storage 111 in association with the captured image data identification information of the captured image to be compared.

The calculation with the correct image data function cannot be applied to the OVD ink or the pearl pigment, the repeatedly laminated layers having different refractive indices, or the cholesteric liquid crystal. In this case, the anti-counterfeit medium 400 is captured from a large number of observation angles, and the pieces of captured image data are recorded in a database in the image data storage 111 as the correct image data. Consequently, the correct image generator 107 may be configured to read the correct image data from the database in association with the observation angle for the captured image data to be compared, and write and store the correct image data address in the captured image data table for authenticity determination in association with the captured image identification information of the captured image data to be compared.

The similarity calculator 108 sequentially reads each of the captured image data identification information and the correct image data address corresponding to determination image data identification information with reference to the captured image data table for authenticity determination in the image data storage 111. Then, the similarity calculator 108 reads the captured image data address corresponding to the captured image data identification information from the captured image data table in the image data storage 111. As a result, the similarity calculator 108 reads the captured image data corresponding to the captured image data address and the correct image data corresponding to the correct image data address from the image data storage 111.

Then, the similarity calculator 108 calculates the similarity of the captured image data with respect to the read correct image data using template matching. For example, the similarity calculator 108 obtains the mean squared error of the luminance value of each of the corresponding pixels (in a color image, each of red, green, and blue (RGB) pixels) of the captured image data and the correct image data. The similarity calculator 108 then adds the mean squared error in all the pixels or a part of the corresponding pixels, and outputs the reciprocal of the addition result indicating the similarity. Therefore, the larger the similarity is, the more similar the captured image data is to the correct image data. As a part of the corresponding pixels, a portion with a characteristic pattern of light that significantly varies in accordance with the observation angle is selected and used with respect to the other pixels in the correct image data.

Alternatively, the similarity calculator 108 may be configured to convert RGB values of all the pixels or a part of the corresponding pixels of the captured image data and the correct image data into an appropriate color space, add the square value of the Euclidean distance in the color space, and output the reciprocal of the addition result indicating the similarity. As in the case of the mean squared error, the larger the similarity is, the more similar the captured image data is to the correct image data.

As described above, the similarity calculator 108 obtains the similarity between each piece of captured image data and the corresponding piece of correct image data sequentially in accordance with the captured image data identification information in the captured image data table for authenticity determination in the image data storage 111. Then, the similarity calculator 108 writes and stores the obtained similarity in the captured image data table for authenticity determination in the image data storage 111 in association with the captured image data identification information of the captured image data for which the similarity has been obtained.

In a case where the intensity of the illumination light at the time of capturing the captured image data does not correspond to that of the correct image data, the pixels cannot be simply compared with each other.

For this reason, the similarity calculator 108 may be configured to make an evaluation based on the RGB color tone between predetermined pixels. Specifically, the similarity calculator 108 may be configured to calculate the reciprocal of the mean squared error of R/G (ratio of R intensity value to G intensity value) between the predetermined pixels of the captured image data and R/G between the pixels of the correct image data corresponding to the predetermined pixels of the captured image data, absorb the difference in the intensity of the illumination light, and calculate a value indicating the accurate similarity. As used herein, the term "predetermined pixels" refers to a combination of two pixels A and B. The ratio R/G is obtained by dividing the R intensity value by the G intensity value for each pixel. Alternatively, B/G (ratio of B intensity value to G intensity value) may be used in combination with R/G As the predetermined pixels, a combination of pixels indicating a large R/G or B/G ratio is set in advance.

The authenticity determinator 109 reads the similarities corresponding to all the pieces of captured image data identification information in the captured image data table for authenticity determination in the image data storage 111. Then, the authenticity determinator 109 compares each of the similarities corresponding to all the pieces of read captured image data identification information with a preset similarity threshold. The similarity threshold is obtained and set as an experimental value in advance. Specifically, the similarities between the pieces of captured image data captured at arbitrary angles (angles within the angle range to be described later) and the pieces of correct image data obtained in association with the observation angles for the pieces of captured image data are calculated for a plurality of different observation angles. Then, experimental similarities that exceed the similarities between the pieces of captured image data and the pieces of correct image data are set for the respective observation angles. Different similarity thresholds are obtained for the respective observation angles, and the authenticity determinator 109 performs the authenticity determination process for the anti-counterfeit medium using the similarity threshold corresponding to the observation angle.

In addition, the authenticity determinator 109 obtains the similarities of one or more pieces of captured image data, and if the similarity of at least one piece of captured image data is less than the similarity threshold, determines that the credit card 300 (authenticity determination object) provided with the anti-counterfeit medium 400 is counterfeit (fake). In contrast, the authenticity determinator 109 obtains the similarities of one or more pieces of captured image data, and if all the similarities are equal to or greater than the similarity thresholds, determines that the credit card 300 (authenticity determination object) provided with the anti-counterfeit medium 400 is authentic (genuine).

Meanwhile, when the notification that the preset luminance of the diffracted light is not detected in the captured image data captured at the predetermined observation position and observation angle is supplied from the imaging condition determinator 106, the authenticity determinator 109 determines that the credit card 300 (authenticity determination object) provided with the anti-counterfeit medium 400 is counterfeit (fake).

The display 110 is, for example, a liquid crystal display, and displays an image thereon.

In the image data storage 111, each of the above-mentioned captured image data, correct image data, captured image data table, captured image data table for authenticity determination, and observation object shape frame table is written and stored.

At the time of imaging, the imaging condition determinator 106 determines whether or not the observation angle at which the anti-counterfeit medium is captured is within a preset angle range. As used herein, the angle range indicates the range of angles in which different colors or patterns of light can be observed on a diffraction grating or a hologram at different observation angles. When the observation angle is not included in the angle range, the correct image data with the captured color or pattern of light corresponding to the observation angle cannot be generated with a high degree of accuracy, and the authenticity of the anti-counterfeit medium cannot be accurately determined.

The imaging condition determinator 106 causes the observation angle estimator 105 to estimate the observation angle that is the imaging direction of the imager 101. Then, imaging condition determinator 106 determines that the angle condition for the imaging process is satisfied when the observation angle estimated by the observation angle estimator 105 is included in the angle range, or that the angle condition for the imaging process is not satisfied when the estimated observation angle is not included in the angle range.

In addition, the imaging condition controller 102 calculates how to move the imager 101 in order to perform capturing from an observation angle capable of authenticity determination when the angle condition is not satisfied based on the determination results of the imaging condition determinator 106. Then, the imaging condition controller 106 displays the guidance display for the movement method on the display screen of the display 110, thereby prompting the user to make an adjustment of the observation angle.

In addition, the imaging condition controller 106 determines whether or not the imager 101 that is about to capture the captured image data meets the imaging condition for capturing the captured image data having a quality comparable with the correct image data. As the imaging condition, whether or not the focal length in the imager 101 is equal to the focal length used in creating the coordinate transformation formula is detected. Then, the imaging condition controller 106 determines that the imaging condition for the imaging process is satisfied when the current focal length is equal to the focal length used in creating the coordinate transformation formula, or that the imaging condition for the imaging process is not satisfied when the current focal length is different from the focal length used in creating the coordinate transformation formula. In addition, the imaging condition controller 106 calculates how to move the imager 101 to make the focal length be equal to the focal length used in creating the coordinate transformation formula when the imaging condition is not satisfied based on the determination results of imaging condition determinator 106. Then, the imaging condition controller 106 displays the guidance display for the movement method on the display screen of the display 110, thereby prompting the user to adjust the focal length. As necessary, the presence or absence of illumination or the illumination intensity may be added as the exposure condition under the imaging condition.

The imaging condition controller 106 also generates a luminance histogram when setting the exposure condition for the imager 101 as the imaging condition. The luminance histogram indicates the intensity distribution among the respective pixels. The imaging condition controller 106 uses the generated luminance histogram for determining whether or not the intensity distribution in the captured image data is biased toward the high-intensity or low-intensity side. For example, when the intensity distribution in the luminance histogram is biased toward the low-intensity side, that is, when the intensities are expressed in 256 levels ranging from "0" to "255", and a large number of pixels in the captured image data have intensities close to "0", blocked-up shadows are generated on the captured image data, and the captured image data cannot be compared with the correct image data. In contrast, when the intensity distribution in the luminance histogram is biased toward the high-intensity side, that is, when a large number of pixels in the captured image data have intensities close to "255", blown-out highlights are generated on the captured image data, and the captured image data cannot be compared with the correct image data.

Therefore, the exposure condition needs to be set so that the intensity distribution exists near the center of the range of "0" to "255" in the luminance histogram.

The imaging condition controller 106 determines whether or not the illumination needs to be adjusted on the basis of the intensity distribution in the luminance histogram. When it is estimated based on the determination results of the imaging condition controller 106 that blocked-up shadows are generated, and the illumination needs to be adjusted so that the distribution in the luminance histogram is shifted to the high-intensity side, the imaging condition controller 106 causes the exposure controller 103 to control the illuminator 104 so that the anti-counterfeit medium 400 is illuminated at a predetermined intensity when captured (for example, flash light is radiated in the imaging direction). In a case where the authenticity determination device 1 does not have the exposure controller 103 and the illuminator 104, the imaging controller 102 displays, on the display screen of the display 110, an indication to prompt the user to irradiate the anti-counterfeit medium 400 with light having a necessary light intensity.

In contrast, when it is estimated based on the determination results of the imaging condition controller 106 that blown-out highlights are generated, and the illumination needs to be adjusted so that the distribution in the luminance histogram is shifted to the low-intensity side based on the determination results of the imaging condition controller 106, the imaging controller 102 causes the exposure controller 103 to control the illuminator 104 so that the anti-counterfeit medium 400 is not illuminated or is illuminated at a predetermined intensity when captured. The imaging controller 102 also displays, on the display screen of the display 110, an indication to prompt the user to reduce the current illumination intensity around the anti-counterfeit medium 400 in order to irradiate the anti-counterfeit medium 400 with light having a necessary light intensity.

In the process described above, an exposure control table containing the distribution state of the luminance histogram and control conditions such as the exposure condition and illumination intensity corresponding to the distribution state may be created and written in advance in the image data storage 111. In this case, the imaging condition controller 106 searches the exposure control table in the image data storage 111 for a luminance histogram similar to the pattern of the luminance histogram of the captured image data to be captured. The imaging condition controller 106 then reads information on the control conditions such as the exposure condition and illumination intensity for the captured image data to be captured, and the imaging controller 102 displays the control conditions on the display screen of the display 110 as described above.

In addition, an illuminance sensor may be provided in the exposure controller 103, and the exposure condition and illumination illuminance may be set on the basis of the illuminance measured with the illuminance sensor. An exposure control table containing the illuminance and control conditions such as the exposure condition and illumination intensity corresponding to the illuminance may be created and written in advance in the image data storage 111. In this case, the imaging condition controller 106 searches the exposure control table in the image data storage 111 in association with the illuminance for capturing the captured image data. The imaging condition controller 106 then reads information on the control conditions such as the exposure condition and illumination intensity for the captured image data to be captured, and the imaging controller 102 displays the control conditions on the display screen of the display 110 as described above.

Figure 10:
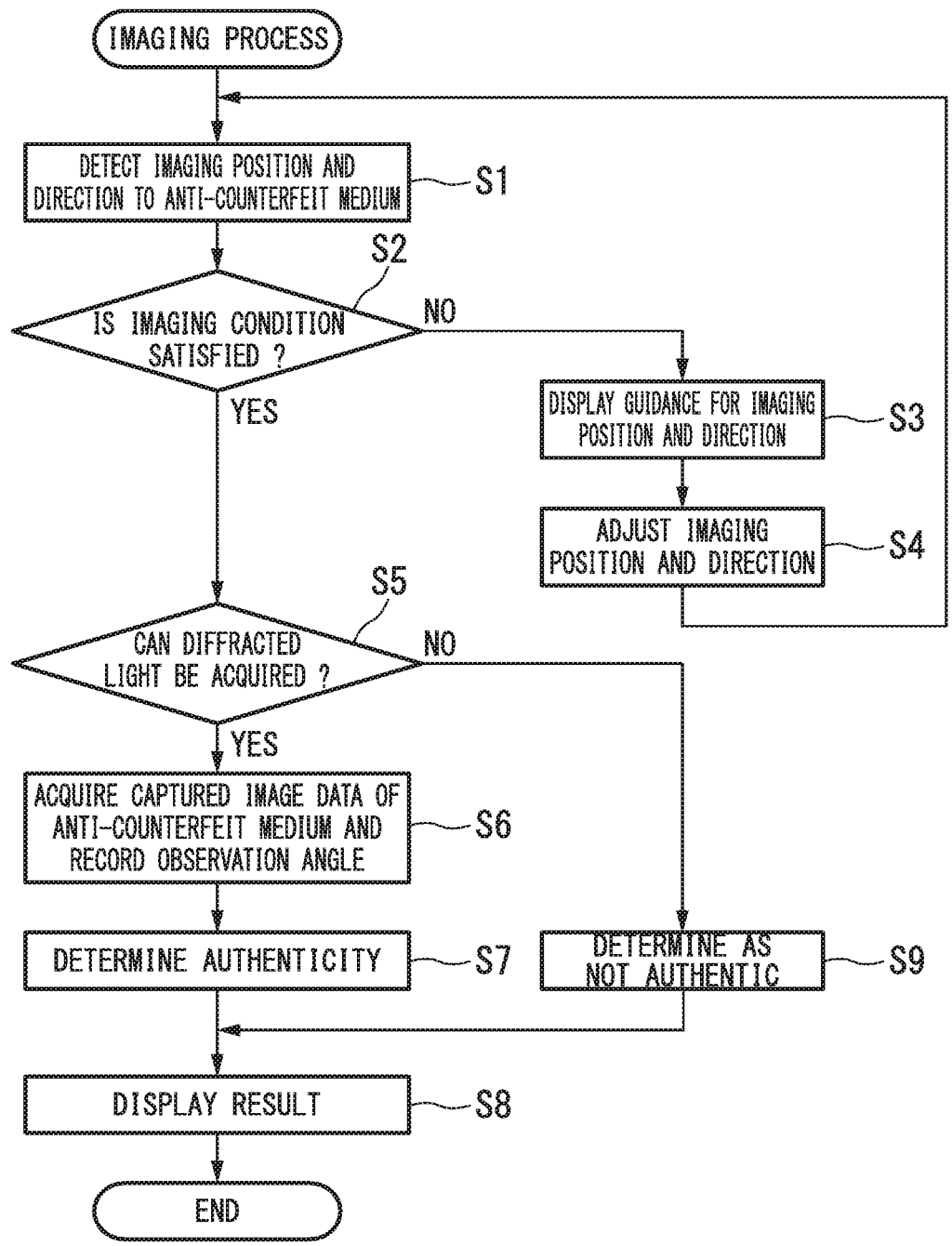
FIG. 10 is a flowchart illustrating an operation example of capturing the captured image data used for the authenticity determination process for the authenticity determination object provided with the anti-counterfeit medium in the identification device of the first embodiment.

FIG. 10 is a flowchart illustrating an operation example of capturing the captured image data used for the authenticity determination process for the authenticity determination object provided with the anti-counterfeit medium in the identification system of the first embodiment. When the user activates an authenticity determination application in, for example, a personal computer, the functions of the respective parts of the identification system are loaded on a main memory of the personal computer. Then, the imager 101 is activated in a video mode, and imaging of an imaging object provided in the imaging direction is started. The captured image data hereinafter indicates images in frame units captured by the imager 101 as a video.

Step S1:

The imaging controller 102 extracts the imaging position of the anti-counterfeit medium 400 in the captured image data. In other words, the imaging controller 102 obtains the three-dimensional shape of the credit card 300 (authenticity determination object) within the imaging range of the imager 101. The imaging controller 102 compares the obtained three-dimensional shape of the credit card 300 with a previously stored three-dimensional shape of the credit card 300, and extracts the region of the anti-counterfeit medium 400 within the imaging range of the imager 101. At this time, the imaging controller 102 may display an image frame in which the image of the credit card 300 is to be fit on the display 110 together with the captured image in the imaging direction to prompt the user to image the credit card 300 at approximate imaging position and imaging angle.

The imaging controller 102 also causes the observation angle estimator 105 to perform an estimation process for the imaging direction of the anti-counterfeit medium 400, that is, the observation angle.

Consequently, the observation angle estimator 105 compares the three-dimensional shape of the credit card 300 in the imaging range of the imager 101 obtained from the captured image data with the three-dimensional shape of the credit card 300 in the three-dimensional coordinate system stored in advance, thereby estimating the observation position and the observation angle of the anti-counterfeit medium 400. Based on the above comparison, the observation angle estimator 105 obtains the imaging position and the imaging direction with which the imager 101 images the credit card 300. The observation angle estimator 105 obtains an angle between the normal of a face of the credit card 300 in the three-dimensional coordinate system to which the anti-counterfeit medium 400 is attached (any one of an upper face or a lower face of the credit card 300 to which the anti-counterfeit medium 400 is attached) and the imaging direction of the imager 101 as the observation angle, and outputs the angle to the imaging controller 102 and the imaging condition determinator 106 together with the observation position.

Step S2:

The imaging condition determinator 106 determines whether or not the observation position and the observation angle of the anti-counterfeit medium 400 by the imager 101 input from the observation angle estimator 105 fall within the ranges of the set observation position and the set observation angle that have been preset, respectively.

When the observation position and the observation angle of the anti-counterfeit medium 400 by the imager 101 fall within the ranges of the set observation position and the set observation angle that have been preset, respectively, the process is advanced to step S5.

On the other hand, when the observation position and the observation angle of the anti-counterfeit medium 400 by the imager 101 do not fall within the ranges of the set observation position and set observation angle that have been preset, respectively, the process is advanced to step S3.

In addition to the determination on the set observation position and the set observation angle, the imaging condition determinator 106 may also determine whether or not all of the imaging conditions such as the focal length and the exposure condition are conditions under which the captured image data available for the authenticity process can be captured. At this time, when the imaging conditions under which the captured image data available for the authenticity process can be captured are obtained, the imaging condition determinator 106 advances the process to step S5. On the other hand, when the imaging conditions under which the captured image data available for the authenticity process can be captured are not obtained, the imaging condition determinator 106 advances the process to step S3.

Step S3:

Based on the determination of the imaging condition determinator 106, the imaging controller 102 compares the set imaging position and the set imaging angle with the imaging position and the imaging angle of the imager 101 estimated from the captured image data, and calculates how to move the imaging position and the imaging angle of the imager 101 to satisfy the imaging conditions. Then, the imaging condition determinator 106 displays the guidance display for the movement method on the display screen of the display 110. The imaging controller 102 may also display the guidance display on how much adjustment is necessary to adjust the imaging conditions such as the focal length and the exposure condition on the display screen of the display 110, based on the determination of the imaging condition determinator 106.

Step S4:

The user adjusts the imaging direction and position of the imager 101 according to the guidance display displayed on the display 110. In addition, the user adjusts the imaging conditions of the imager 101 such as the focal length and the exposure condition according to the guidance display displayed on the display 110.

Step S5:

The imaging condition determinator 106 determines whether or not the diffracted light from the anti-counterfeit medium 400 is equal to or greater than a preset luminance value for the captured image data being captured by the imager 101 at the imaging position and the imaging angle included in the ranges of the set imaging position and the set imaging angle that have been preset.

When the diffracted light from the anti-counterfeit medium 400 is equal to or greater than the preset luminance value in the captured image data being captured by the imager 101, the imaging condition determinator 106 advances the process to step S6. On the other hand, when the diffracted light from the anti-counterfeit medium 400 is less than the preset luminance value in the captured image data being captured by the imager 101, the imaging condition determinator 106 advances the process to step S9.

Step S6:

The imaging condition determinator 106 writes and stores the captured image data being captured by the imager 101 in a predetermined region of the image data storage 111.

The imaging condition determinator 106 assigns the captured image data identification information to the captured image data written in the image data storage 111 to write and store in the captured image data table for authenticity determination in the image data storage 111, together with the observation angle, the observation position, and the captured image data address that is the address of the region of the image data storage 111 in which the captured image data is written.

Step S7:

The similarity calculator 108 sequentially reads the captured image data addresses from the captured image data table for authenticity determination in the image data storage 111 and reads the captured image data from predetermined regions of the image data storage 111 indicated by the captured image data addresses. The similarity calculator 108 obtains the similarity between the read captured image data and the correct image data generated by the correct image generator 107. The authenticity determinator 109 determines the authenticity of the captured image data based on the similarity between the captured image data and the correct image data (details will be described later).

Step S8:

The authenticity determinator 109 displays, on the display 110, the result of the authenticity determination for the anti-counterfeit medium 400 captured in the captured image data.

Step S9:

Since the diffracted light from the anti-counterfeit medium 400 is less than the preset luminance value in the captured image data being captured by the imager 101, the imaging condition determinator 106 determines at that point in time that the anti-counterfeit medium is fake (counterfeit article/duplication, that is, illicit article). In other words, since a predetermined optical change cannot be obtained at the preset observation angle, the imaging condition determinator 106 judges at that point in time that the anti-counterfeit medium is fake (counterfeit article/duplication, that is, illicit article).

Figure 11:
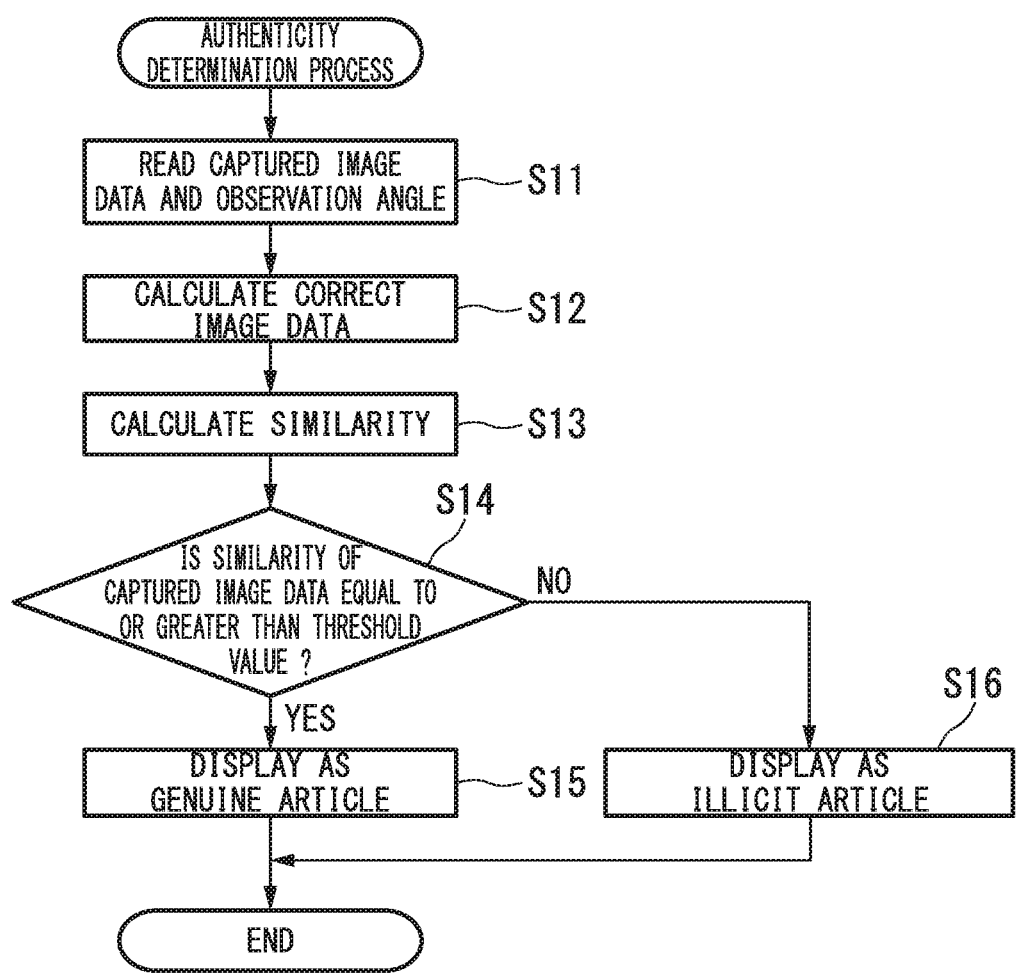
FIG. 11 is a flowchart illustrating an operation example of the authenticity determination process for the authenticity determination object provided with the anti-counterfeit medium in the identification device of the first embodiment.

Next, FIG. 11 is a flowchart illustrating an operation example of the authenticity determination process for the authenticity determination object provided with the anti-counterfeit medium in the identification system of the present embodiment. The flowchart of FIG. 11 explains in detail an operation example of the authenticity determination process in FIG. 10.

Step S11:

The correct image generator 107 refers to the captured image data table for authenticity determination to read, from the captured image data table in the image data storage 111, the information on the observation angle and observation position indicated by the captured image data identification information of the authenticity determination object.

Step S12:

Then, the correct image generator 107 generates the correct image data to be compared with the captured image data based on the information on the observation angle and observation position. The correct image generator 107 then writes and stores the generated correct image data in the image data storage 111. In addition, the authenticity determinator 109 writes and stores, in the captured image data table for authenticity determination in the image data storage 111, the correct image data address indicating the address in which the correct image data has been written together with the captured image data identification information.

Step S13:

Next, the similarity calculator 108 reads, from the captured image data table in the image data storage 111, the captured image data address of the captured image data to be subjected to the authenticity determination. The similarity calculator 108 also reads, from the captured image data table for authenticity determination in the image data storage 111, the correct image data address corresponding to the captured image identification information of the captured image data to be subjected to the authenticity determination. Then, the similarity calculator 108 reads the captured image data and the correct image data from the image data storage 111 using the captured image data address and the correct image data address, respectively.

Next, the similarity calculator 108 calculates the similarity between each piece of captured image data and the corresponding piece of correct image data, for example, by adding the mean squared error of the luminance value of each of the pixels in all the pixels (or preset feature points) and setting the reciprocal as the similarity.

The similarity calculator 108 then writes and stores the calculated similarity in the captured image data table for authenticity determination in the image data storage 111 in association with the captured image data identification information indicating the captured image data to be subjected to the determination.

Step S14:

The authenticity determinator 109 reads, from the image data storage 111, the similarity threshold corresponding to the captured image data to be subjected to the determination, and reads, from the captured image data table for authenticity determination in the image data storage 111, the similarity of the captured image data to be subjected to the determination.

Then, the authenticity determinator 109 determines whether or not the read similarity is equal to or greater than the similarity threshold. If the similarity is equal to or greater than the similarity threshold, the authenticity determinator 109 advances the process to step S15. In contrast, if the similarity is less than the similarity threshold, the authenticity determinator 109 advances the process to step S16.

Step S15:

The authenticity determinator 109 generates a display image indicating that the anti-counterfeit medium subjected to the determination is authentic (genuine article).

Step S16:

The authenticity determinator 109 generates a display image indicating that the anti-counterfeit medium subjected to the determination is fake (counterfeit article/duplication, that is, illicit article).

Owing to the above-described configuration, according to the present embodiment, the captured image data obtained by imaging the anti-counterfeit medium is compared with the correct image data that is the authentic image of the anti-counterfeit medium at the observation angle of the captured image data, whereby whether the anti-counterfeit medium is authentic or fake is determined. Therefore, without using a conventional special authenticity determination device and without depending on the installation state of the anti-counterfeit medium, the user performs imaging simply by following the guidance using a simple image capturing device such as a general-purpose digital camera without being conscious of the optical change property and the observation angle of the anti-counterfeit medium. It is possible to easily perform the authenticity determination (identification as to whether authentic or fake) for the anti-counterfeit medium by the captured image.

Furthermore, according to the present embodiment, when the predetermined optical change cannot be obtained at the preset observation angle, that is, when the luminance value of the diffracted light incident from the anti-counterfeit medium at the preset observation angle is a luminance value less than the preset similarity threshold, the anti-counterfeit medium is judged to be fake (counterfeit article/duplication, that is, illicit article) at that point in time, so that the authenticity determination process can be speeded up.

Second Embodiment

Hereinafter, a second embodiment of the present invention will be described with reference to the drawings.

The configuration of an identification system (authenticity determination device, or identification device) according to the second embodiment is similar to the identification system of FIG. 1 according to the first embodiment; however, some functions are different. In the first embodiment, the authenticity determination process is performed even when only a single piece of captured image data can be used for the authenticity determination. In the second embodiment, the authenticity determination process is performed when a preset number or more of pieces of captured image data can be used for the authenticity determination. In this case, a set number of pieces of captured image data need to be captured at different observation angles.

Figure 12:
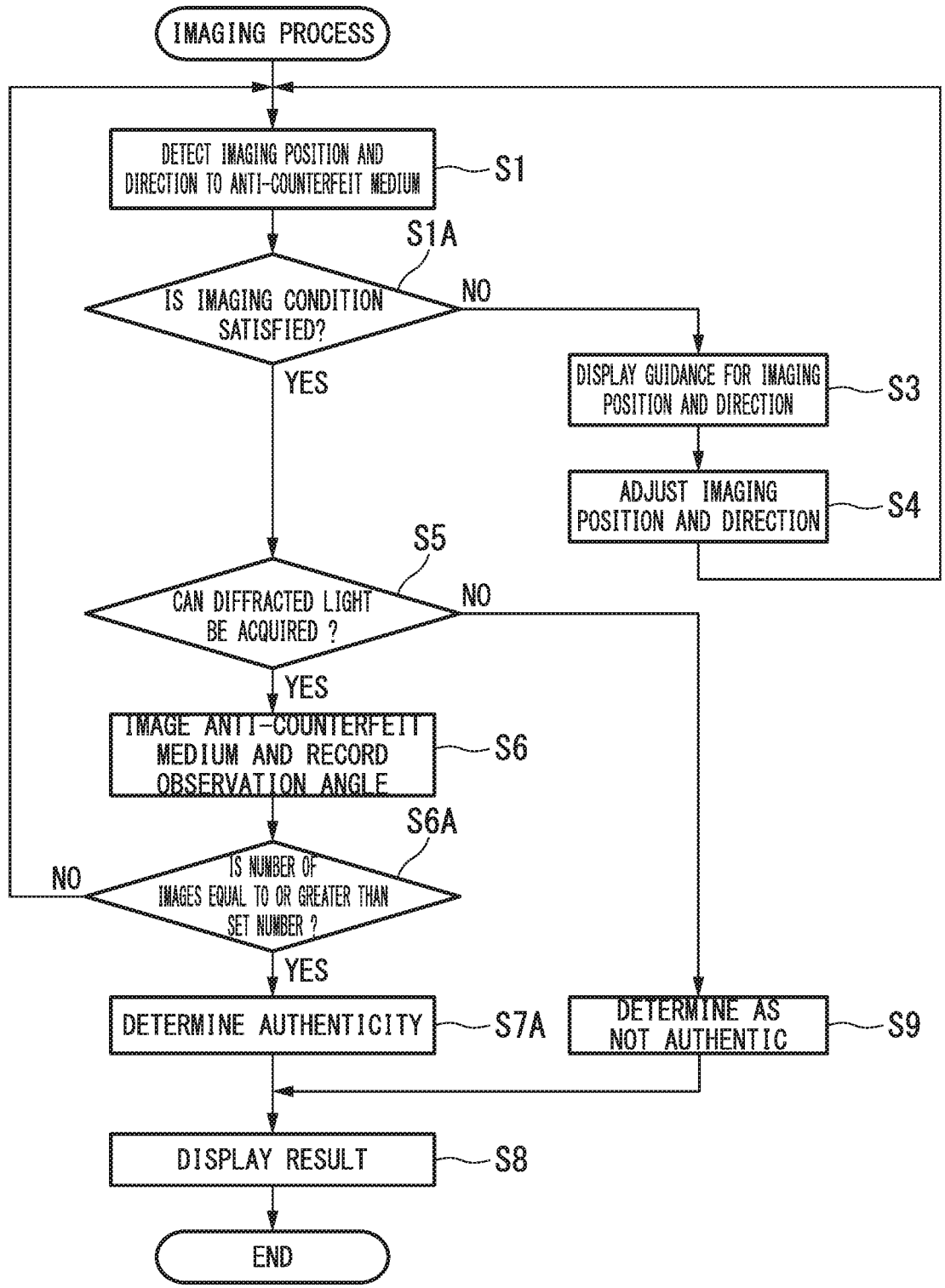
FIG. 12 is a flowchart illustrating an operation example of the capturing process for the authenticity determination object provided with the anti-counterfeit medium in the identification device of the second embodiment.

FIG. 12 is a flowchart illustrating an operation example of the capturing process for the authenticity determination object provided with the anti-counterfeit medium in the identification system of the second embodiment.

In FIG. 12, Steps S1, S3-S6, S8, and S9 are similar to those of the flowchart of FIG. 10 according to the first embodiment. Hereinafter, only the operation different from that of the first embodiment will be described.

Step S1A:

The imaging condition determinator 106 determines whether or not the observation position and the observation angle of the anti-counterfeit medium 400 by the imager 101 input from the observation angle estimator 105 are an observation position and an observation angle different from those of the captured image data that has been already captured and whether or not the above observation position and observation angle fall within the ranges of the set observation position and the set observation angle that have been preset, respectively.

When the observation position and the observation angle of the anti-counterfeit medium 400 by the imager 101 are an observation position and an observation angle different from those of the captured image data that has been already captured and fall within the ranges of the set observation position and the set observation angle that have been preset, respectively, the process is advanced to step S5.

On the other hand, when the observation position and the observation angle of the anti-counterfeit medium 400 by the imager 101 are an observation position and an observation angle similar to those of the captured image data that has been already captured or do not fall within the ranges of the set observation position and the set observation angle that have been preset, respectively, the process is advanced to step S3.

In addition to the determination on the set observation position and the set observation angle, the imaging condition determinator 106 may determine whether or not all of the imaging conditions such as the focal length and the exposure condition are conditions under which the captured image data available for the authenticity process can be captured. At this time, when the imaging conditions under which the captured image data available for the authenticity process can be captured are obtained, the imaging condition determinator 106 advances the process to step S5. On the other hand, when the imaging conditions under which the captured image data available for the authenticity process can be captured are not obtained, the imaging condition determinator 106 advances the process to step S3.

Step S6A:

The imaging controller 102 determines whether or not the set number or more of images has been captured. When the number of captured images is equal to or greater than the set number of images, the imaging controller 102 advances the process to step S7A. On the other hand, when the number of captured images is less than the set number of images, the imaging controller 102 advances the process to step S1.

Step S7A:

The authenticity determinator 109 determines the authenticity of the captured image data based on the similarity between a plurality of pieces of the captured image data and the correct image data (details will be described later).

Figure 13:
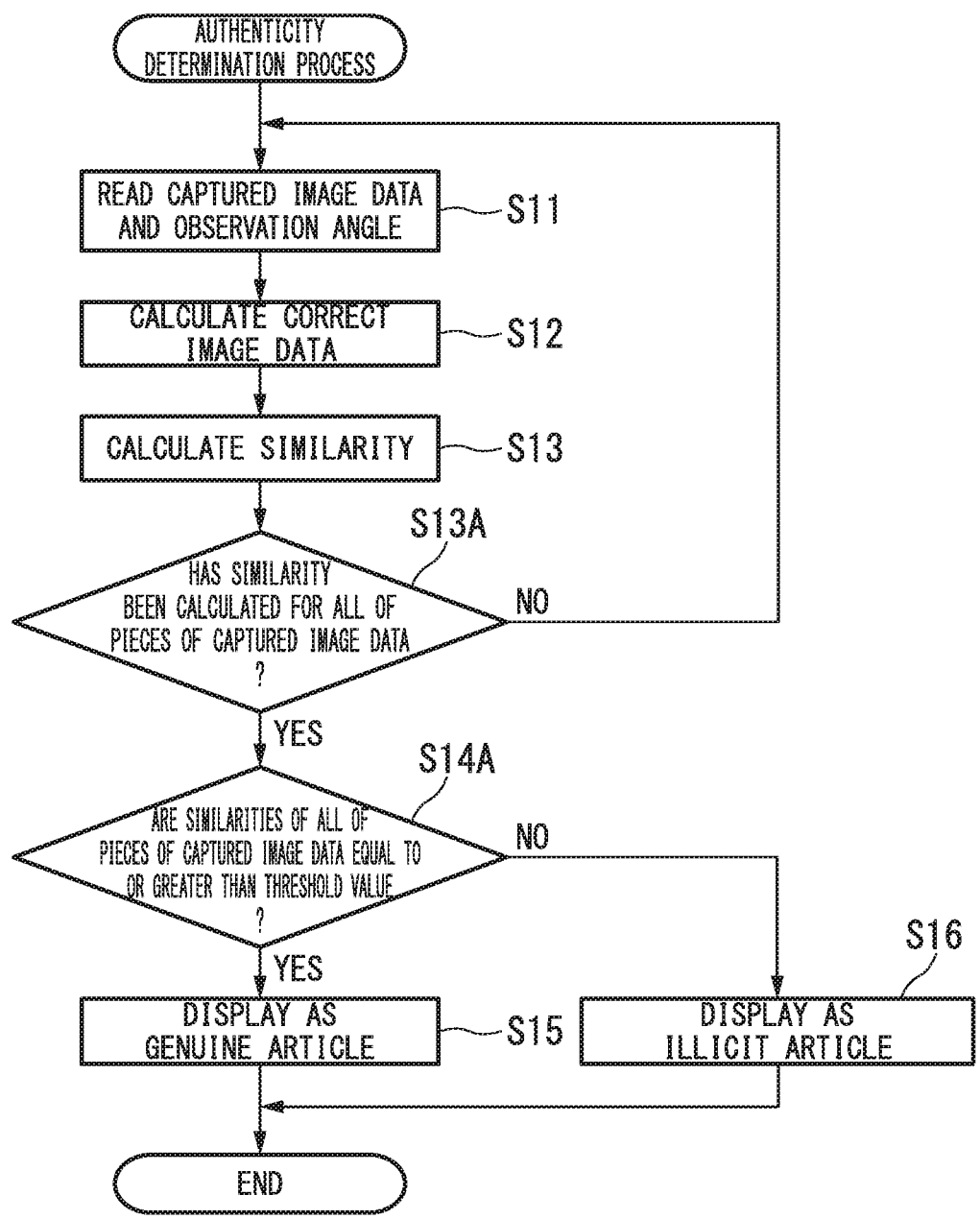
FIG. 13 is a flowchart illustrating an operation example of the authenticity determination process for the authenticity determination object provided with the anti-counterfeit medium in the identification device of a second embodiment.

FIG. 13 is a flowchart illustrating an operation example of the authenticity determination process for the authenticity determination object provided with the anti-counterfeit medium in the identification system of the second embodiment. The flowchart of FIG. 13 explains in detail an operation example of the authenticity determination process in FIG. 12.

Steps S11 to S13, S15, and subsequent steps are similar to those of the flowchart of FIG. 11 according to the first embodiment. Hereinafter, only the operation different from that of the first embodiment will be described.

Step S13A:

The similarity calculator 108 determines whether or not there is (remains) captured image data that has not been subjected to a similarity calculation process in the captured image data table for authenticity determination in the image data storage 111.

When the captured image data that has not been subjected to the similarity calculation process remains in the captured image data table for authenticity determination, the similarity calculator 108 advances the process to step S11. On the other hand, when the captured image data that has not been subjected to the similarity calculation process does not remain in the captured image data table, the similarity calculator 108 advances the process to step S14A.

Step S14A:

The authenticity determinator 109 sequentially reads the similarities in the captured image data table for authenticity determination in the image data storage 111 and determines whether or not each of the similarities is equal to or greater than the preset similarity threshold.

When all of the similarities of the captured image data indicated by captured image data identification information in the captured image data table for authenticity determination are equal to or greater than the similarity threshold, the authenticity determinator 109 judges that the anti-counterfeit medium is authentic and the authenticity determination object is a genuine article (genuine), and advances the process to step S15. On the other hand, when the captured image data indicated by the captured image data identification information in the captured image data table for authenticity determination includes a similarity less than the similarity threshold, the authenticity determinator 109 judges that the anti-counterfeit medium is counterfeit (fake) and the authenticity determination object is an illicit article, and advances the process to step S16.

Owing to the above-described configuration, according to the present embodiment, a preset number or more of pieces of the captured image data obtained by imaging the anti-counterfeit medium at different observation angles is compared with respective pieces of the correct image data that are the authentic images of the anti-counterfeit medium at the respective observation angles of these pieces of the captured image data, whereby whether the anti-counterfeit medium is authentic or fake is determined. Therefore, without using a conventional special authenticity determination device and without depending on the installation state of the anti-counterfeit medium, the user performs imaging simply by following the guidance using the captured image of the anti-counterfeit medium by a simple image capturing device such as a general-purpose digital camera without being conscious of the optical change property and the observation angle of the anti-counterfeit medium. It is possible to easily perform the authenticity determination (identification as to whether authentic or fake) for the anti-counterfeit medium from the captured image. In addition, in the present embodiment, since the number of pieces of data which is the number of pieces of captured image data that can be used for the authenticity determination is set in accordance with the characteristics of the anti-counterfeit medium, the authenticity of each anti-counterfeit medium can be determined with a high degree of accuracy.

Third Embodiment

Hereinafter, a third embodiment of the present invention will be described with reference to the drawing.

Figure 14:
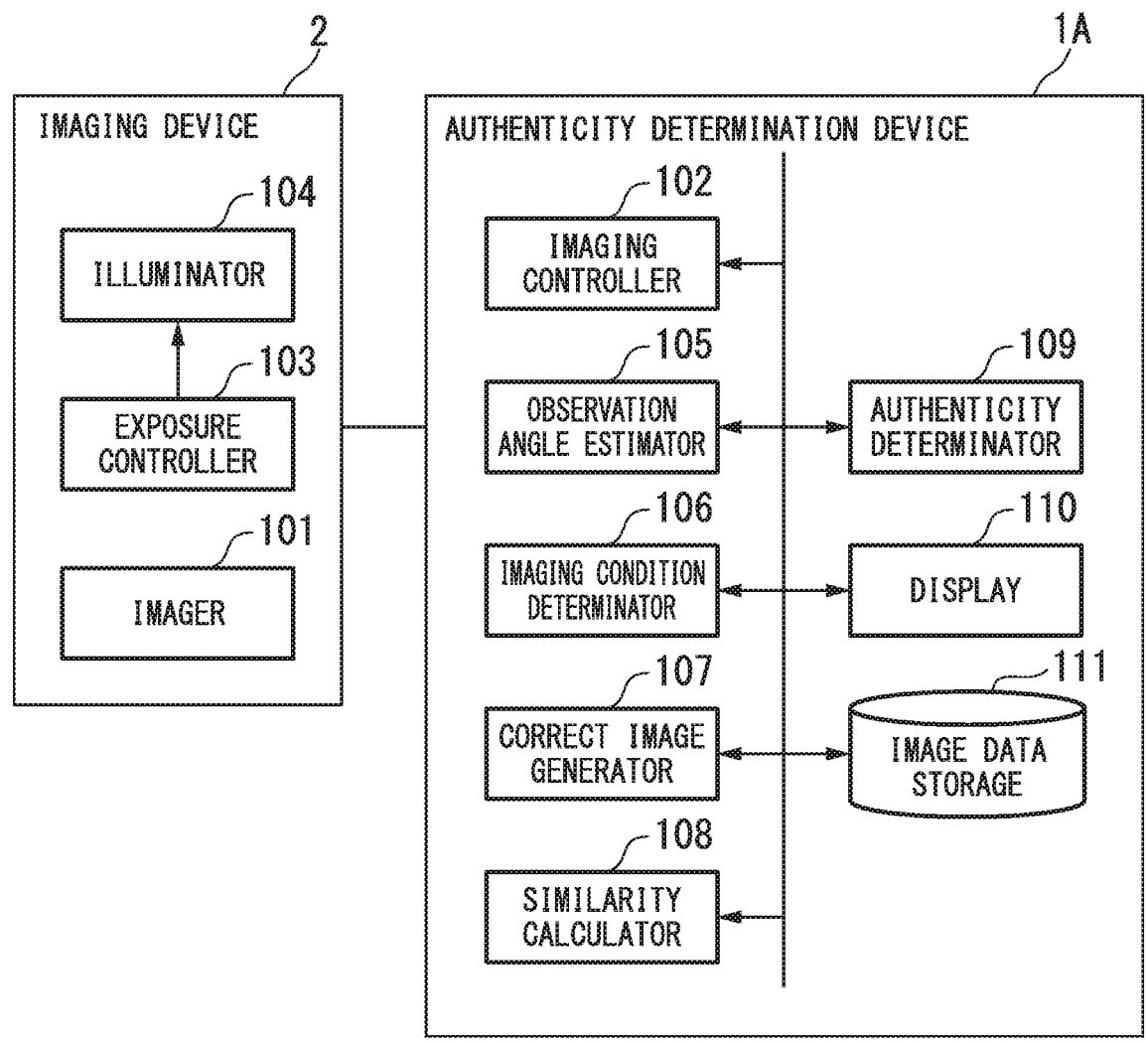
FIG. 14 is a block diagram illustrating an exemplary configuration of an identification device according to a third embodiment.

FIG. 14 is a block diagram illustrating an exemplary configuration of an identification system according to the third embodiment. In FIG. 14, the identification system includes an authenticity determination device 1A and an imaging device 2. The authenticity determination device 1A includes the imaging controller 102, the observation angle estimator 105, the imaging condition determinator 106, the correct image generator 107, the similarity calculator 108, the authenticity determinator 109, the display 110, and the image data storage 111. The imaging device 2 includes the imager 101, the exposure controller 103, and the illuminator 104. In FIG. 14, the components similar to those of the first embodiment are denoted by the same reference signs.

In the present embodiment, the identification system is configured so that the imaging and exposure functions in the first embodiment are separated from the authenticity determination device 1A and included in the imaging device 2. Consequently, a general-purpose digital camera, a mobile terminal (including a mobile phone and a smartphone) or the like can be easily used as the imaging device for capturing the captured image data for the authenticity determination.

The authenticity determination device 1A may have a cloud configuration so as to be communicable with a digital camera or a mobile terminal using an information communication line such as the Internet (not illustrated). Then, as similar to the first or second embodiment described above, the authenticity determination device 1A may be configured to perform the authenticity determination process for the anti-counterfeit medium using the captured image data sent from the digital camera or the mobile terminal.

The authenticity determination process may be performed on the anti-counterfeit medium using the captured image data in such a manner that a program for realizing the function of the authenticity determination device 1 in FIG.

1 or the authenticity determination device 1A in FIG. 14 according to the present invention is recorded in a computer-readable recording medium, and the program recorded in the recording medium is read and executed by a computer system. As used herein, the "computer system" includes an OS and hardware such a peripheral device.

The "computer system" also includes a WWW system provided with a webpage provision environment (or display environment). The "computer-readable recording medium" refers to a storage device such as a portable medium and a hard disk incorporated in the computer system. Examples of the portable medium include a flexible disk, a magneto-optical disk, a ROM, a CD-ROM, and the like. In a case where the program is sent via a network such as the Internet or a communication line such as a telephone line, the "computer-readable recording medium" includes a server and a volatile memory (RAM) in the computer system that serves as a client, which hold the program for a certain period of time.

The program may be transmitted from the computer system equipped with a storage device or the like containing the program to another computer system via a transmission medium or by a transmission wave in the transmission medium. As used herein, the "transmission medium" for transmitting the program refers to a medium having the function of transmitting information, examples of which include a network (communication network) such as the Internet and a communication line (communication wire) such as a telephone line. The program may realize a part of the above-described functions. Furthermore, the program may be a difference file (difference program) which can realize the above-described functions in combination with a program already recorded in the computer system.

What is claimed is:

1. An identification device that performs authenticity determination on an article with an anti-counterfeit medium attached, the identification device comprising:
    at least one processor configured to execute computer-readable instructions to:
    determine an imaging condition as to whether or not an optical change in the anti-counterfeit medium is imageable from an observation angle that is an angle of captured image data captured by a sensor in an imaging direction with respect to a reference line on an observation object surface of the anti-counterfeit medium, the anti-counterfeit medium being designed such that an observed pattern of light varies as the observation angle varies;
    obtain a degree of similarity between the captured image data and correct image data generated from the optical change corresponding to the observation angle when it is determined that the optical change in the anti-counterfeit medium is imageable from the observation angle under the imaging condition; and
    perform authenticity determination as to whether or not the anti-counterfeit medium is correct based on whether or not the degree of the similarity exceeds a preset similarity threshold,
    wherein, the degree of similarity is calculated from luminance of light from the anti-counterfeit medium and input to the sensor.

2. The identification device according to claim 1, wherein the at least one processor is to determine the imaging condition for pieces of the captured image data sequentially input as frames of a moving image.

3. The identification device according to claim 1, wherein the at least one processor is to determine the anti-counterfeit medium is correct when the number of pieces of the captured image data determined to be authentic from among the predetermined number of pieces of the captured image data is equal to or greater than a preset number.

4. The identification device according to claim 1, wherein the at least one processor is to determine whether or not the optical change is imageable based on whether or not the luminance of light input from the anti-counterfeit medium exceeds the preset similarity threshold.

5. The identification device according to claim 1, wherein the at least one processor is to determine that the anti-counterfeit medium is not authentic when it is determined that the optical change is not imageable.

6. The identification device according to claim 1, wherein at least one processor is to instruct to move an imaging device to an observation angle at which the optical change is observable when it is determined that the optical change is not imageable under the imaging condition.

7. The identification device according to claim 1, wherein at least one processor is to compare a plurality of different pieces of captured image data with correct images generated from optical changes corresponding to the observation angles of the pieces of captured image data, and perform the authenticity determination based on whether or not the similarity between each of the pieces of captured image data and the corresponding piece of correct image data exceeds the similarity threshold.

8. The identification device according to claim 1, at least one processor is to obtain, by a predetermined coordinate transformation formula, a position and an imaging direction with which the captured image data was captured in a three-dimensional space in which the anti-counterfeit medium was placed when the captured image data was captured and obtain the observation angle according to the position and the imaging direction.

9. An identification method of performing authenticity determination on an article with an anti-counterfeit medium attached, the identification method comprising:
    determining, by at least one processor, an imaging condition as to whether or not an optical change in the anti-counterfeit medium is imageable from an observation angle that is an angle of captured image data captured by a sensor in an imaging direction with respect to a reference line on an observation object surface of the anti-counterfeit medium, the anti-counterfeit medium being designed such that an observed pattern of light varies as the observation angle varies;
    obtaining, by the at least one processor, a degree of similarity between the captured image data and correct image data generated from the optical change corresponding to the observation angle when it is determined that the optical change in the anti-counterfeit medium is imageable from the observation angle under the imaging condition; and
    performing, by the at least one processor, authenticity determination as to whether or not the anti-counterfeit medium is correct based on whether or not the degree of the similarity exceeds a preset similarity threshold,
    wherein, the similarity is calculated from luminance of light from the anti-counterfeit medium and input to the sensor.

10. A computer-readable medium comprising an identification program that is configured to cause a computer to execute an authenticity determination method on an article with an anti-counterfeit medium attached, the authenticity determination method comprising:

determining an imaging condition as to whether or not an optical change in the anti-counterfeit medium is imageable from an observation angle that is an angle of captured image data captured by a sensor in an imaging direction with respect to a reference line on an observation object surface of the anti-counterfeit medium, the anti-counterfeit medium being designed such that an observed pattern of light varies as the observation angle varies;

obtaining a degree of similarity between the captured image data and correct image data generated from the optical change corresponding to the observation angle when it is determined that the optical change in the anti-counterfeit medium is imageable from the observation angle under the imaging condition; and performing authenticity determination as to whether or not the anti-counterfeit medium is correct based on whether or not the degree of the similarity exceeds a preset similarity threshold, wherein, the similarity is calculated from luminance of light from the anti-counterfeit medium and input to the sensor.

11. The identification device according to claim 6, wherein, when it is determined that the optical change is not imageable under the imaging condition, the at least one processor calculates an amount of angle movement of the imaging device such that the optical change is imageable under the imaging condition, and the imaging controller instructs to move the imaging device to a calculated observation angle at which the optical change is observable based on the amount of angle movement of the imaging device.

12. The identification device according to claim 11, the at least one processor determines whether or not the optical change is imageable based on whether or not the observation angle falls within a ranges of a set observation angle that have been preset.

13. The identification device according to claim 11, the amount of angle movement of the imaging device is calculated from:

a set imaging position and a set imaging angle based on the determining the image condition; and an imaging position and an imaging angle of the imaging device estimated from the captured image data.

* * * * *